United States Patent [19]

Hackett, Jr.

[11] Patent Number: 5,005,189

[45] Date of Patent: Apr. 2, 1991

[54] DETECTION OF DIGITAL SIGNALS RECEIVED FROM MULTIPATH CHANNELS

[76] Inventor: Charles M. Hackett, Jr., 38 Farragut, Irvine, Calif. 92720

[21] Appl. No.: 300,785

[22] Filed: Jan. 23, 1989

[51] Int. Cl.[5] ............................................. H04L 1/00
[52] U.S. Cl. .................................... 375/101; 455/143; 364/726
[58] Field of Search .................... 375/82, 84, 101, 102, 375/94; 455/143, 303; 364/480, 485, 726; 370/23

[56] References Cited

U.S. PATENT DOCUMENTS

| | | | |
|---|---|---|---|
| 3,984,634 | 10/1976 | Painter | 375/101 |
| 4,063,281 | 12/1977 | Kornreich et al. | 358/105 |
| 4,412,339 | 10/1983 | Alfke et al. | 375/82 |
| 4,529,941 | 7/1985 | Lipoff | 375/82 |
| 4,564,952 | 1/1986 | Karabinis et al. | 375/101 |
| 4,780,885 | 10/1988 | Paul et al. | 375/40 |

Primary Examiner—Douglas W. Olms
Assistant Examiner—Stephen Chin

[57] ABSTRACT

Methods for detection or, or equivalently, demodulation of phase-and-amplitude-shift-keyed communication signals that may be received via multipath propagation or dispersion in a noisy channel are disclosed. The signal format has a block structure with a fixed pattern preceding and following the data portion of each block. Implementation is accomplished in real-time by obtaining samples of the complex-envelope of the received waveform, processing at the symbol rate mainly in the frequency domain, then returning to the time domain with a coagulated signal where ordinary detection of the symbols is completed according to the modulation in use. The signal format and computation in the frequency domain permit the estimation of the multipath-structure of the channel, which in turn permits the estimation of the data using a reasonable amount of processing. Performance of the basic method is substantially improved by generating a metric and searching for alterations of the data that reduce the metric. The search can be controlled by an indicant vector that identifies those symbols of a block that are likely to be in error. Synchronization is obtained by trial using the basic method to compare the detected pattern with the known pattern.

9 Claims, 7 Drawing Sheets

DETECTION OF DIGITAL SIGNALS RECEIVED FROM MULTIPATH CHANNELS

REFERENCES

1. M. Schwartz, W. R. Bennett, and S. Stein: *Communication Systems and Techniques*, McGraw-Hill, New York, 1966.
2. F. M. Hsu, A. A. Giorgano, H. E. dePedro, and J. G. Proakis: "Adaptive Equalization Techniques for High-Speed Transmission on Fading Dispersive HF Channels", *Record of National Telecommunications Conference*, Houston, Dec 1980.
3. F. Ling and J. G. Proakis: "Adaptive Lattice Decision-Feedback Equalizers - Their Performance and Application to Time Variant Multipath Channels", *IEEE Transactions on Communications* Vol. COM-33, No. 4, Apr 1985.
4. E. Eleftheriou and D. D. Falconer: "Adaptive Equalization Techniques for HF Channels", *IEEE Journal on Selected Areas in Communications* Vol. SAC-5, No. 2, Feb 1987.
5. J. M. Perl, A. Shpegel, and A. Reichman: "Adaptive Receiver for Digital Communication Over HF Channels", *IEEE Journal on Selected Areas in Communications* Vol. SAC-5, No. 2, Feb 1987.
6. C. C. Watterson, J. R. Juroshek, and W. D. Bensema: "Experimental Confirmation of an HF Model", *IEEE Transactions on Communication Technology* Vol. COM-18, No. 6, Dec 1970.
7. R. W. Lucky: "Automatic Equalization for Digital Communication", *Bell System Technical Journal* Vol. XLIV, No. 4, Apr 1965.
8. J. G. Proakis: *Digital Communications* (Chapter 7), McGraw-Hill, New York, 1983.
9. D. Chase: "A Class of Algorithms for Decoding Block Codes with Channel Measurement Information", *IEEE Transactions on Information Theory* Vol. 18, No. 1, Jan 1972.

BACKGROUND OF THE INVENTION

This invention relates to methods and apparatus for detection of phase-and-amplitude-shift-keyed communication signals that may experience multipath propagation and/or other dispersion as well as additive noise prior to reception. The terms detection and demodulation are used synonomously throughout. The method applies to electromagnetic, acoustic, and other types of communication signals that travel through the atmosphere, water, or any other medium. As does all known prior art, it requires that the signal have a block format with a fixed, known pattern interspersed between data segments.

The problem that inspired the concept and development of the invention is that of detecting a quadraphse-shift-keyed (QPSK) signal transmitted through a fading channel. Of primary interest is the high-frequency (HF) radio band that is heavily used for long-haul commercial and military communications of many types. It is well known that such signals propagate for long distances due to one or more reflections from the ionosphere and the surface of the earth and that the fading of these signals often experienced at the receiver is due largely to the interference that occurs when there are multiple paths by which the signal reaches the receiver (cf. Reference 1). The unreliability of communication due to fading has classically been dealt with by various diversity techniques discussed in Reference 1.

In the last decade or so, substantial effort has been devoted to the improvement of HF detection directly without using diversity techniques (cf. References 2-5). There are many reasons for this: (1) In some applications diversity techniques are not feasible. (2) Watterson et al (Reference 6) have constructed a detailed mathematical model of HF propagation that has been quite widely accepted as satisfactory for the design and testing of HF communication systems. (3) Automatic equaliztion techniques had been sucessfully used on telephone channels (cf. Reference 7). (4) Theory and practice of adaptive systems were growing rapidly. (5) Relatively inexpensive microprocessors had become available to implement much more powerful algorithms in real-time. (6) It seemed that the performance attained on dynamic fading channels was quite far from its limit (cf. Reference 8).

Probably due to the influence of Reference 7 all recent approaches to improved detection at HF use adaptive equalization wherein intersymbol interference is minimized by setting tapweights of a transversal filter in response to a training signal. The weights are usually adjusted during the data portion of the transmission by a tracking algorithm. It has proved to be difficult to detect the data conveyed by the signal and to minimize the intersymbol interference simultaneously, because an error in one function tends to degrade the other function. Rapidly fading channels have been particularly difficult to handle satisfactorily by this approach (cf. Reference 4).

The approach used by the invention disclosed here is quite classical, but substantially different from the popular decision-feedback equalization used by others. Basically it computes an estimate of the multipath-structure of the channel that prevails for each block of data, then it uses this estimate to coagulate the dispersive effects of the channel so that data detection can be performed by ordinary means.

The invention avoids the convolutions that time domain computations would require by working in the frequency domain via the fast Fourier transform (FFT).

Performance of the invention is substantially improved by testing sets of symbols likely to be in error using a metric that measures the discrepancy between observation and the implication of the estimates.

The invention disclosed here has applications not only to electromagnetic signals at HF but also in other frequency bands and to accoustic signals where multipath propagation and/or dispersion can degrade performance.

OBJECTS AND ADVANTAGES

The object of the invention is an efficient and robust demodulator having excellent performance for any phase-and-amplitude-shift-keyed communication signal transmitted through a channel subject to noise and dynamic fading due to variable multipath propagation.

The performance of a demodulator for digital signals is measured by the error rate as a function of the signal-to-noise ratio and the fading bandwidth, which indicates how rapidly the channel can change. The bit-error rate for the invention used with quadraphase-shift-key (QPSK) modulation and channel parameters appropriate for signalling at a data rate of 2400 bits per second has been obtained by computer simulation and is shown in FIG. 6 for the basic invention and in FIG. 7 for the enhanced invention.

The curve of FIG. 7 labelled "Estimate for Maximum-Likelihood Detection" is believed to be an optimistic estimate of the performance of an ideal maximum-likelihood detector for a slowly fading channel. It is seen that the performance realized by the invention falls within about 1.5 decibels of the estimate for an ideal detector for zero-bandwidth fading and that performance degrades slowly as the fading bandwidth increases to about 10 hz. This performance appears to be substantially better than that obtainable from the usual approach that uses a decision-feedback equalizer. (Cf. reference 4.)

The amount of processing required to realize this invention in real time is well within current microprocessor technology and is comparable to or less than that required for decision-feedback equalization.

The invention is supported in the case of slow fading by mathematical theory that is outlined as the invention is described in the Operation Section. This theory will be reported in detail in a paper currently in preparation by the inventor.

One of the features of this invention is that it will recover the transmitted data exactly if channel noise is negligible and the duration of the channel impulse-response is within the design limit. Furthermore, the invention will perform well when practicalities of physical channels such as noise and intersymbol interference due to receiver filtering are also taken into account.

It will be seen that the invention can operate with any type of phase-and-amplitude-shift-keyed communication signal, with or without a carrier, propagating through any medium where detection is possible in the simple case of single-path reception.

DRAWING FIGURES

KEY TO NUMERALS ON FIGURES

Figure 1:
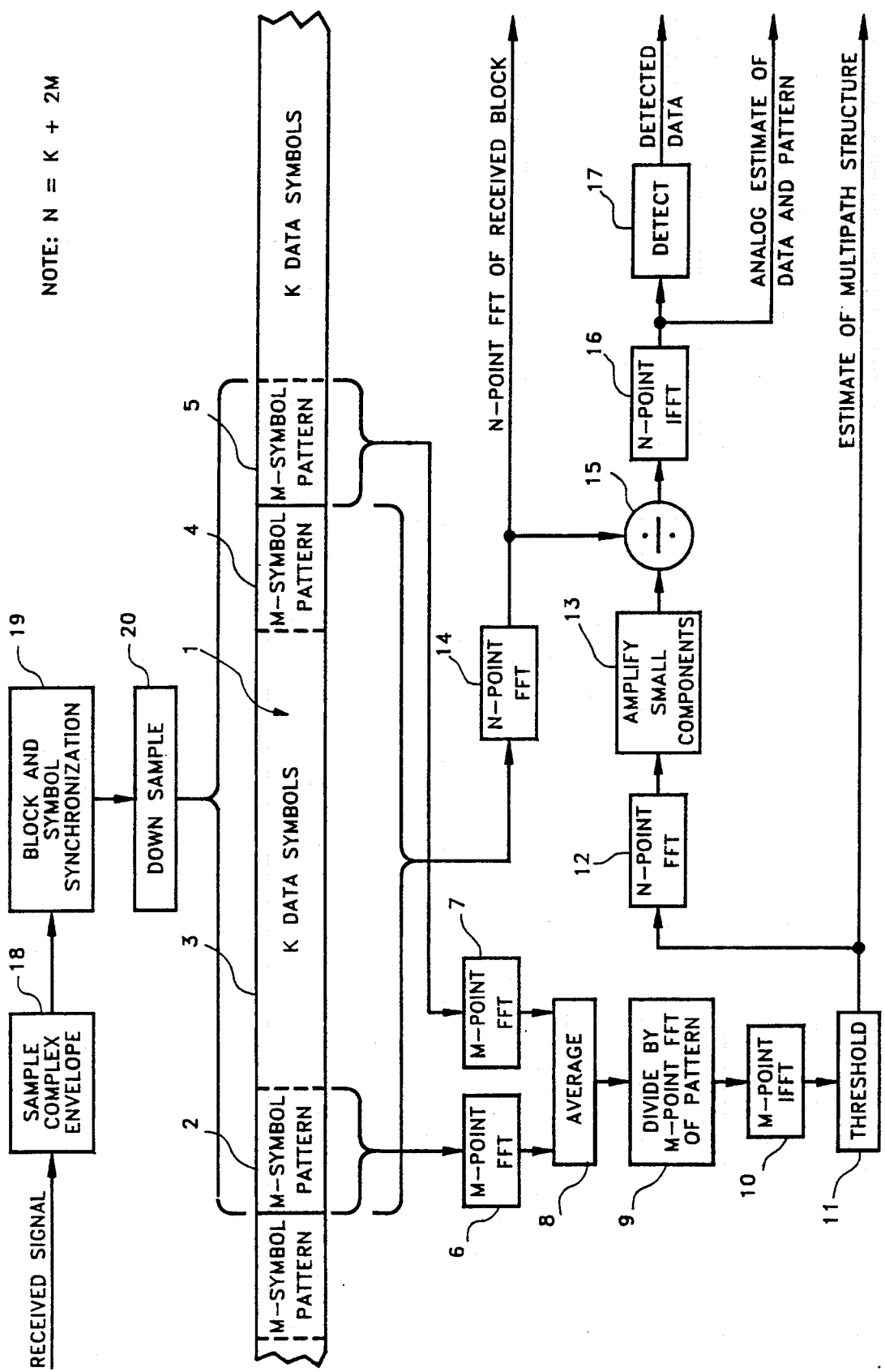
FIG. 1 is a block diagram of the basic method for detection of a multipath signal.

1: Block of N received symbols comprised of first a pattern of M symbols corresponding to the M-symbol pattern trasnmitted at the start of the block, followed by K received data symbols, and terminated by the pattern of M symbols received just after the data symbols.

2,5: Buffer stores the pattern (delineated by dashed lines) of M symbols received preceding the data symbols of a block.

3: Buffer stores (delineated by dashed lines) of K data symbols whose values are to be detected by the receiver.

4: Buffer stores the pattern (delineated by dashed lines) of M symbols received following the data symbols of a block.

6,7: Takes the M-point FFT of the input sub-block of M received symbols.

8: Forms a component-by-component weighted average of the input FFT's.

9: Performs component-by-component division of the output of 8 by the precomputed M-point FFT of the fixed pattern.

10: Takes the M-point IFFT of the input sub-block of M symbols.

11: Replaces by zero each symbol whose absolute value is less than a threshold.

12: Pads the M-symbol input block with K+M zeros and takes the N-point FFT of the result.

13,60: Amplifies each symbol with absolute value less than a constant times the rms value of the received symbols so that the result has absolute value equal to this constant times the rms value and the same phase as the input symbol. Replaces zero by this constant times the rms value.

14: Takes the N-point FFT of the input block of symbols.

15: Performs component-by-component division of the output of 14 by the output of 13.

16: Takes the N-point IFFT of the input block to obtain the analog estimate of the entire received block.

17: Performs symbol-by-symbol detection, i.e., decides which of the possible symbols was transmitted according to the modulation in use, assuming single-path propagation.

18: Samples the complex envelope of the received signal at an integer multiple of the symbol rate.

19: Achieves block- and symbol-synchronization.

20: Downsamples to the symbol rate.

21: Sets the beginning and terminating sub-blocks of M symbols each to the fixed pattern. Adjusts the data portion of the block under control of 26. Retains in memory that block of data found to have the smallest metric.

22,32,42,52: Takes the N-point FFT of the input block of symbols.

23,33,43,53: Multiples component-by-component the two input N-point FFT's.

24,34,44,54: Forms the difference of the N-point FFT of the received block and the output of 23, 33, 43, or 53.

25,35,45,55: Sums the squares of the absolute values of the components of the error vector to give the metric.

26: Uses a function of the analog estimate of the data, the error vector, the metric, and the N-point FFT of the estimate of the multipath-structure of the channel to control adjustments of the detected data.

27: Adjusts the estimate of the multipath-structure under control of 29. Retains in memory that estimate for which the metric has been found to be smallest.

28,38,48,58: Pads the M-symbol input block with K+M zeros and takes the N-point FFT of the result.

29: Uses a function of the estimate of the multipath-structure, the error vector, and the metric to control adjustment of the estimate of the multipath-structure.

31,41,51: Sets the beginning and terminating sub-blocks of M symbols each to the fixed pattern. Adjusts the symbols of the data sub-block according to the indicant and the set of error-checking routines selected. Retains in memory that block of data found to have the smallest metric.

36: Replaces the analog estimate of each data bit by its absolute value.

37,47,57: Adjusts the estimate of the multipath-structure by moving down the gradient until a near-minimum metric is reached.

39,49,59: Determines the gradient of the metric with respect to the real and imaginary parts of the components of the estimated multipath-structure.

46: Determines the gradient of the metric with respect to the analog estimates of the data bits.

61: Performs component-by-component division of the output of 54 by the output of 60.

OPERATION

As indicated in FIG. 1, the format of a signal for which this invention is designed has a block structure wherein each block 1 of N symbols consists of K data symbols preceded by a fixed pattern of M symbols and followed by the same fixed pattern of M symbols, where N, K, and M are positive integers such that $N=K+2M$. Each succeeding block immediately follows the preceding one, i.e., there is no time interval between the last symbol of one block and the first symbol of the next block.

M is selected so that all of the significant part of the impulse-response of the channel occurs within the time period occupied by the transmission of M symbols. For efficient use of transmitter power K is relatively large compared to 2M. For most efficient processing both N and M are powers of two. However, reasonable operation is possible if N or M is not a power of two.

The modulation is required to be phase-and/or-amplitude-shift-keyed; any constellation of signal vectors is acceptable. Since operation with QPSK modulation epitomizes the invention, it will be assumed for illustrative purposes. Biphase-shift-key modulation can be regarded as a degenerate case of QPSK modulation and all operations performed by the invention apply to it directly. For more general signal constellations, the error-checking procedures of the enhanced invention can be generalized in obvious ways.

For the illustrative case of QPSK modulation, a symbol consists of a pair of real numbers that is conveniently regarded as one complex number. A transmitted block is represented by a fixed pattern of M complex numbers, followed by K complex numbers that convey 2K bits of data, followed by the same fixed pattern of M complex numbers.

Explanation of the operation of the inventions requires the use of the concept of the "complex-envelope" of a signal, which is a generalization of the concept of a phasor used in AC circuit analysis. The complex-envelope of a signal is defined and explained in many textbooks on signal analysis and system theory (cf. References 10-12).

A receiver obtains by any of several well-known means 18 samples of the complex-envelope of the received signal at an integral multiple of the symbol rate. These samples are input to a digital signal processor wherein all operations described in the sequel are implemented. Among the devices that are suitable for these signalprocessing operations are the Texas Instruments TMS-320 series, the Motorola DSP56000 series, and Analog Devices ADSP-2100 series of digital-signal-processing chips.

A synchronization process 19 that will be described later in this section establishes symbol synchronization and block synchronization, then downsampling 21 and reduces the (complex) sample rate to the symbol rate. For the present, it is assumed that symbol synchronization and block synchronization have been established and complex samples of the received signal are available at the symbol rate.

Samples for one signal block 1 are buffer-stored so that the K data symbols stored in 3 and the two M-symbol patterns stored in 2 and 4 that surround them are available simultaneously. Also in buffer storage 5 at the same time is the M-symbol pattern that starts the next succeeding block.

If the channel impulse-response is simply a delayed impulse, then in the absence of noise a received block is identical within a scalar factor to the transmitted block of symbols. More generally, a channel impulse-response is composed of many impulses of different amplitudes, phases, and times-of-arrival. In the general case, the sampled complex-envelope of the received waveform is the convolution of the transmitted sequence with the impulse response of the channel.

The channel is effectively digitized by the sampling process at the receiver. The receiver presents to the invention a sequence of complex samples that are the result of convolving the transmitted sequence with the unknown impulse-response of the digital channel then adding noise.

Assuming that the channel is stationary, observe that the sub-block 1 of M symbols received at the beginning of a block is the cyclic convolution of the transmitted block of M pattern symbols with the unknown channel impulse-response plus noise. Hence, the M-point FFT of this sub-block is the component-by-component product of the M-point FFT of the pattern and that of the impulse-response of the channel plus the FFT of the noise.

Therefore, the impulse-response of the channel could be determined approximately by taking the M-point FFT 6 if this sub-block of M symbols, dividing by the precomputed M-point FFT of the fixed pattern, then taking the M-point inverse fast Fourier transform (IFFT). Noise considerations indicate that each component of the FFT of a good pattern have large absolute value. If a pattern can be found whose components have equal absolute values, it is an optimum pattern; if not, a pattern having the largest minimum absolute component value should be used.

Since many physical channels of interest are dynamic, i.e., changing with time, a better estimate of the channel impulse-response is obtained by averaging the M-point FFT's 6, 7 of the appropriate M-symbol sub-blocks surrounding the data. Thus, these two sub-blocks are averaged 8, weighting each inversely as its distance from the center of the data. Then this average is divided 9 component-by-component by the precomputed M-point FFT of the fixed pattern, and an M-point IFFT 10 is taken to obtain an estimate of the impulse-response of the channel, or, equivalently, the multipath-structure of the channel.

The multipath-structure of the channel has the form of an M-dimensional complex vector, the i-th component of which indicates the amplitude and phase of the impulse-response at the delay of i-1 symbol periods after the first component. Due to the presence of noise, the estimate just described will nearly always have non-zero values for all components, even though only a few paths are physically present. Hence, a threshold 11 is established such that components with absolute values smaller than the threshold are set to zero, but others remain unaltered.

Having an estimate of the multipath-structure of the channel, the same approach is used to obtain an estimate of the data symbols. First, the M-component estimate of the channel multipath-structure is padded with N-M zeros and an N-point FFT 12 taken of the result. In order to avoid the large amplification of noise that can result when dividing by a number having small absolute value, each component value less than a critical value equal to a constant times the rms value of the block is amplified 13 by a positive real number so that its absolute value has the critical value of the block. In the unlikely event that a complex zero occurs, it is replaced by the critical value. Then the results of this amplification are used to divide 15 the N-point FFT 14 of the entire received block 1. The N-point IFFT 16 of the quotient then gives an analog estimate of all of the received symbols, pattern as well as data.

A detector 17 appropriate for single-path detection of the modulation being used gives the basic estimate of the data. For QPSK modulation the detector would be simply a determination of the sign of the real and imaginary parts of the analog estimate.

Figure 2:
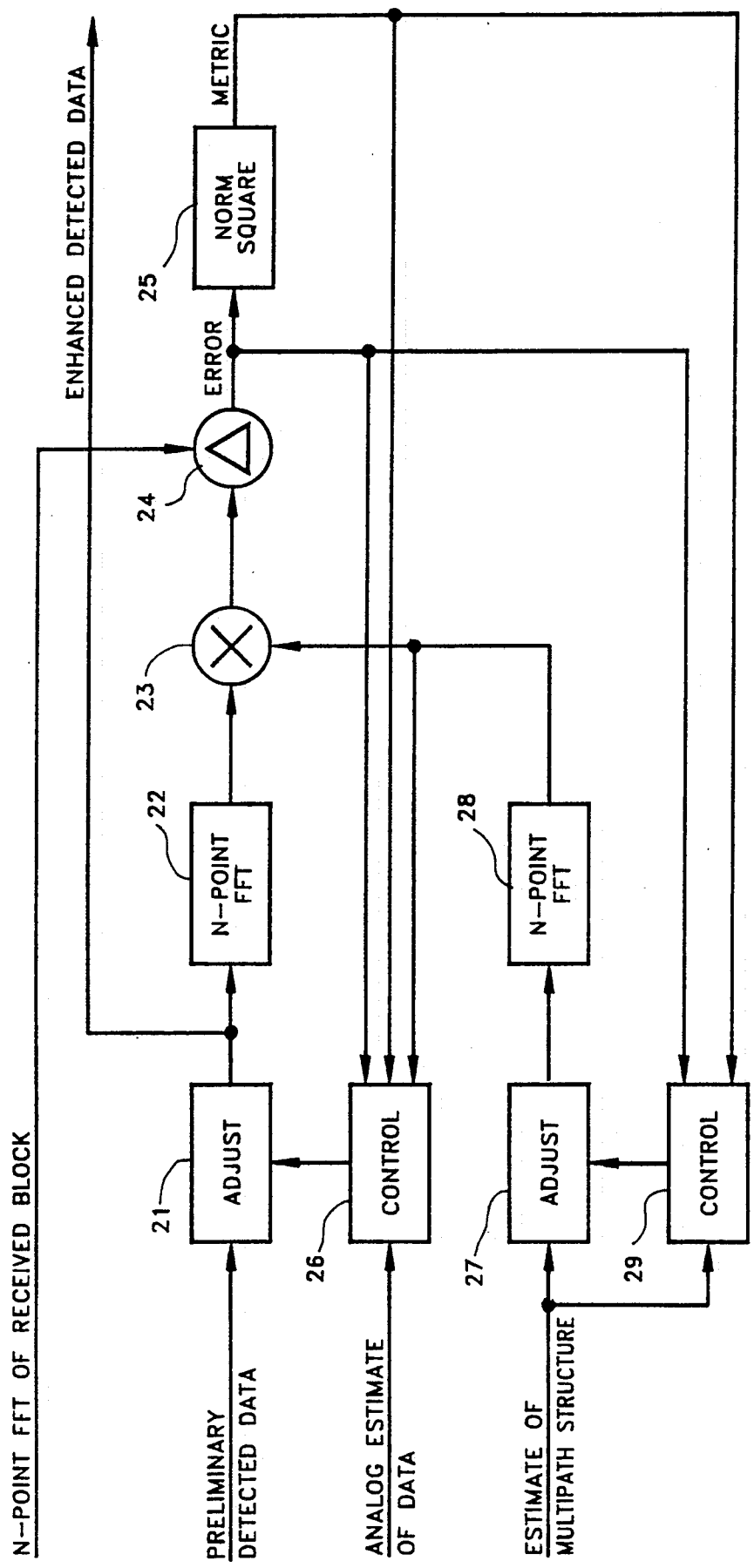
FIG. 2 is a generic block diagram of the enhanced method for detection of a multipath signal.

FIG. 2 shows generically a method that significantly improves the estimate of the data. Available from the basic method for detection of a multipath signal are, for each block, the preliminary detected data, an estimate of the multipath-structure of the channel, and the N-point FFT of the received block.

The preliminary detected data along with the fixed pattern are used to construct 21 the block of N symbols that is the current estimate of the transmitted block. Then the N-point FFT 22 of the complex-envelope of the modulated signal that this block defines is multiplied 23 component-by-component by the N-point FFT 28 of the estimate of the channel multipath-structure padded 27 with K+M zeros. The difference 24 between the result and the N-point FFT of the received block is the error vector (in the frequency domain).

The error vector reflects the estimation errors of both the data symbols and the channel multipath structure. Hence, it can be used to control adjustments of both the data symbols and the estimate of the channel multipath structure so that better estimates, i.e., those with a smaller error vector, are obtained.

A metric or non-negative number is needed that provides a measure of the difference between the computed N-point FFT of the received block and that which would result if the detected data were transmitted over a channel having the estimated multipath-structure.

The norm-square 25, i.e., the sum of the squares of the absolute values of all components, of the error vector is the square of the customary metric. This metric is, of course, not unique; other metrics could be defined and used. To avoid computing square-roots, the norm-square is used as the metric.

Since for nearly all physical channels a lower metric indicates a more likely combined data and path estimates, improved estimates can be obtained by searching over possible data blocks and multipath-structures. Because there is usually a very large number of possibilities, searching over all possibilities is not ordinarily feasible due to processing limitations. Therefore, the cases that are searched should be selected judiciously. There are many reasonable ways to control the search. FIG. 2 shows that, generically, control 26 of the (digital) data search may depend on some combination of the analog estimate of the data, the error vector, the metric, and the N-point FFT of the estimate of the channel multipath-structure, while control 29 of the (analog) channel-multipath-structure search may depend on some combination of the estimate of the channel multipath-structure, the error vector, and the metric.

Practical searches can be controlled by an indicant. An indicant is a vector whose components generally give some indication of the effect on the metric of altering the corresponding components of the data. Enhancement of the invention by the use of three different indicants is diagrammed in FIGS. 3,4, and 5. These will be described assuming that QPSK modulation is employed.

Figure 3:
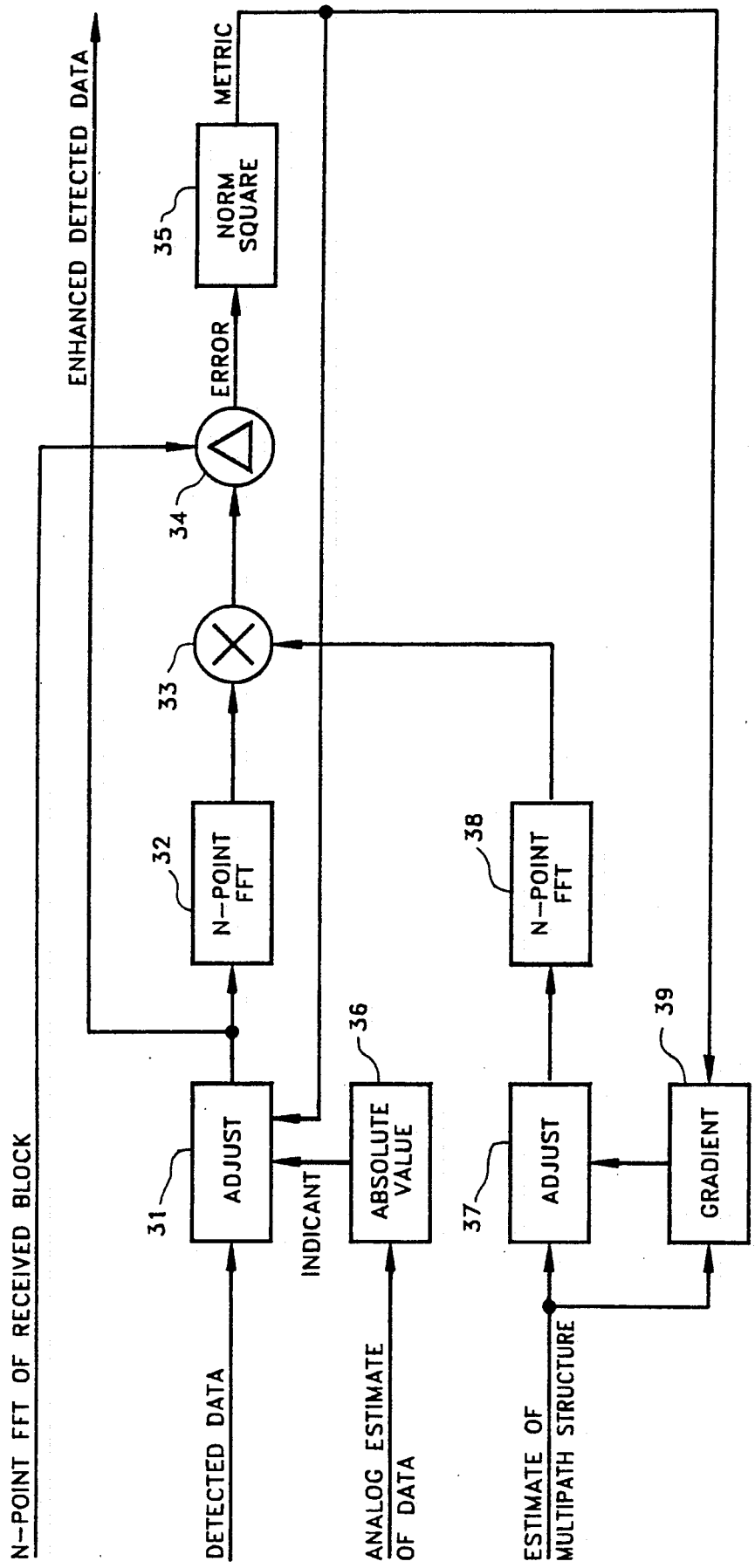
FIG. 3 is a block diagram of the enhanced method for detection of a multipath signal using an indicant based on the absolute values of the estimates of the data bits.

The indicant of FIG. 3 is obtained simply by taking the absolute values 36 of the real and imaginary parts of the components of the analog estimate of the data. The bits most likely to be in error are those with smallest absolute values, so adjustment of the detected data is performed for these bits individually and in combinations and the resultant metric is compared to the current metric. If it is lower, the adjusted data is retained, as a more likely data block has been found. The search continues using one or more search routines until all cases prescribed by the routine(s) have been tested.

Several search routines have been found to be effective. One called Correlation Check is similar to the technique employed by Chase (Reference 9) for analog decoding of error-correcting codes. Correlation Check tests all $2^C$ combinations of possible error patterns in the C bits that the indicant shows most likely to be in error. As the value of K is increased, the effectiveness of this test increases until it achieves that of maximum likelihood detection. Unfortunately, the processing required by Correlation Check grows exponentially with C, so it is not usually possible to implement maximum-likelihood detection.

A search routine called Single Check checks each of the Ns bits most likely to be in error, changing the bit when a lower metric is found. This routine can be terminated after Ns bits have been checked or iterated until no further changes can occur. As Ns is increased, Single Check catches more errors, but it does not approach maximum-likelihood performance, even at the limit of Ns. Processing requirements grow only linearly with Ns, but sorting of 2K real numbers to identify the Ns most likely error locations is required.

Because Single Check can not achieve maximum-likelihood performance, a Double Check routine is useful. This routine checks all pairs of bits in the Nd bits most likely to be in error. It should be used in combination with Single Check. Its processing requirements grow as the square of Nd, but its sorting requirements are satisfied by the sorting done for Single Check.

Obviously, Triple Check and higher-order checking routines can be constructed. Used in combination their performance can approach that of maximum-likelihood detection, but processing requirements usually become prohibitive before this point is reached.

Another search routine that is very helpful in certain cases, such as when all signal paths have the same phase, is the String Check routine. For QPSK modulation it checks for a string of error in the real (or imaginary)

parts of symbols in the vicinity of a bit which is indicated likely to be in error, even if the indicant values for the other bits of the string do not indicate an especially high likelihood of error.

Which search routines are used in any particular application depends on the nature of the channel and the amount of processing that can be devoted to their implementation. If feasible, they should be determined by a tradeoff study that tries various possibilities in order to select a near-optimum set.

After the selected set of search routines has been executed, performance is usually improved by refining the estimate of the multipath-structure of the channel. The technique shown in FIG. 3 computes the gradient 39 of the metric with respect to the real and imaginary parts of the components of the channel multipath-structure, and adjusts 37 the estimate of the structure by moving down the gradient until a minimum or near-minimum is reached. Then the selected set of search routines is repeated using the refined estimate of the multipath-structure.

Further refinement of the estimate of the multipath-structure of the channel and iteration of the error-checking routines can often further improve performance. Investigation indicates that it is better to refine the estimate of the multipath-structure of the channel before running the error-checking routines, rather than afterward.

Figure 4:
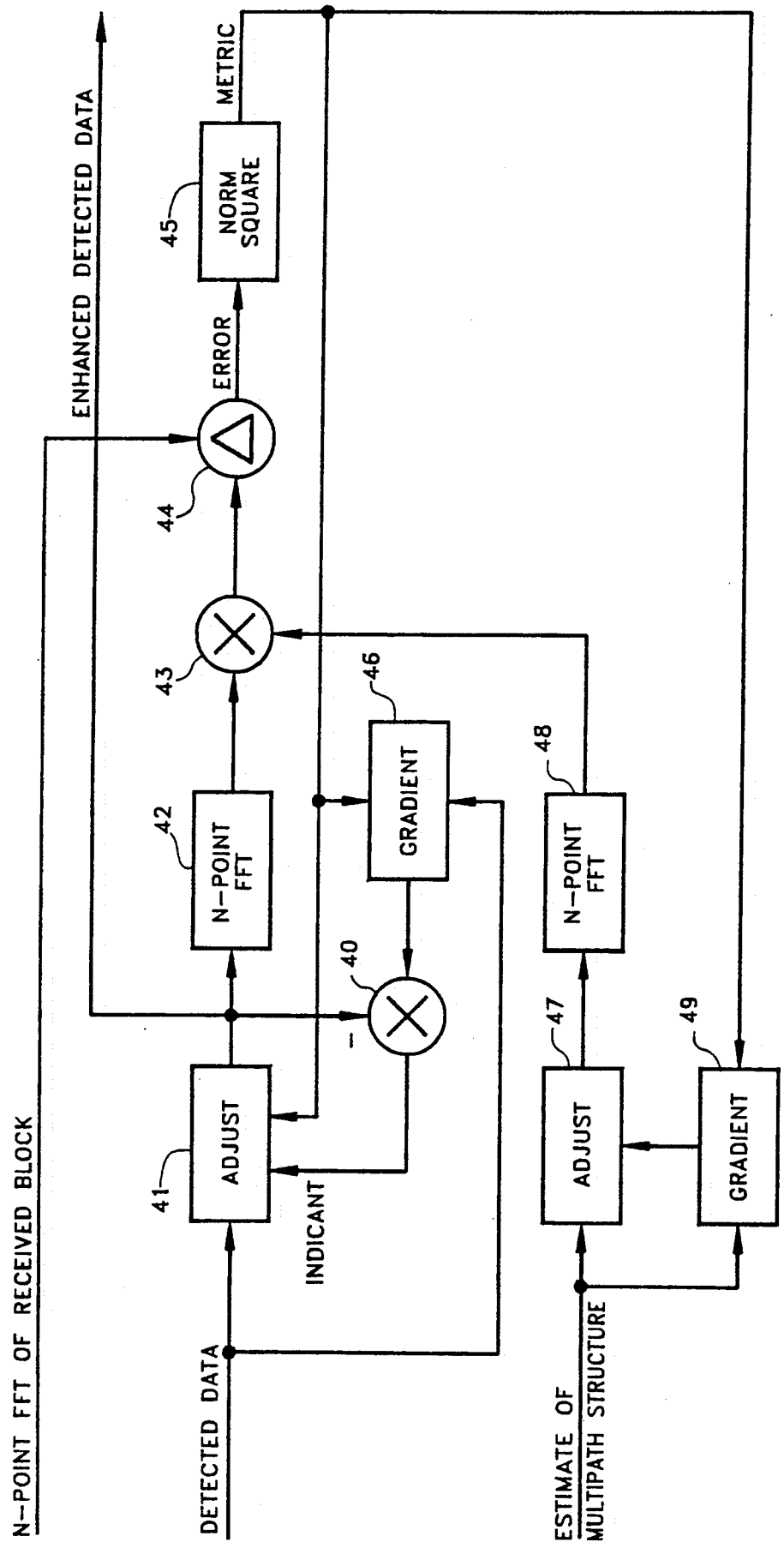
FIG. 4 is a block diagram of the enhanced method for detection of a multipath signal using an indicant based on the gradient of a metric with respect to the data bits.

FIG. 4 shows an indicant obtained by computing the gradient 46 of the metric with respect to the real and imaginary parts of the detected data with sign obtained by multiplying 40 each component of the gradient by $-/+1$ according to whether the corresponding component of data is positive or negative. The highest values of this indicant often reveal where there are errors in the corresponding components of the detected data.

The gradient indicant is used the same way as the absolute-bit-value indicant: alternately, the estimated multipath-structure of the channel is refined, and a selected set of search routines is used to enhance the detected data, using as many iterations as desired. The gradient indicant offers somewhat better performance than the absolute-bit-value indicant, but the gradient computation requires significantly more processing.

Figure 5:
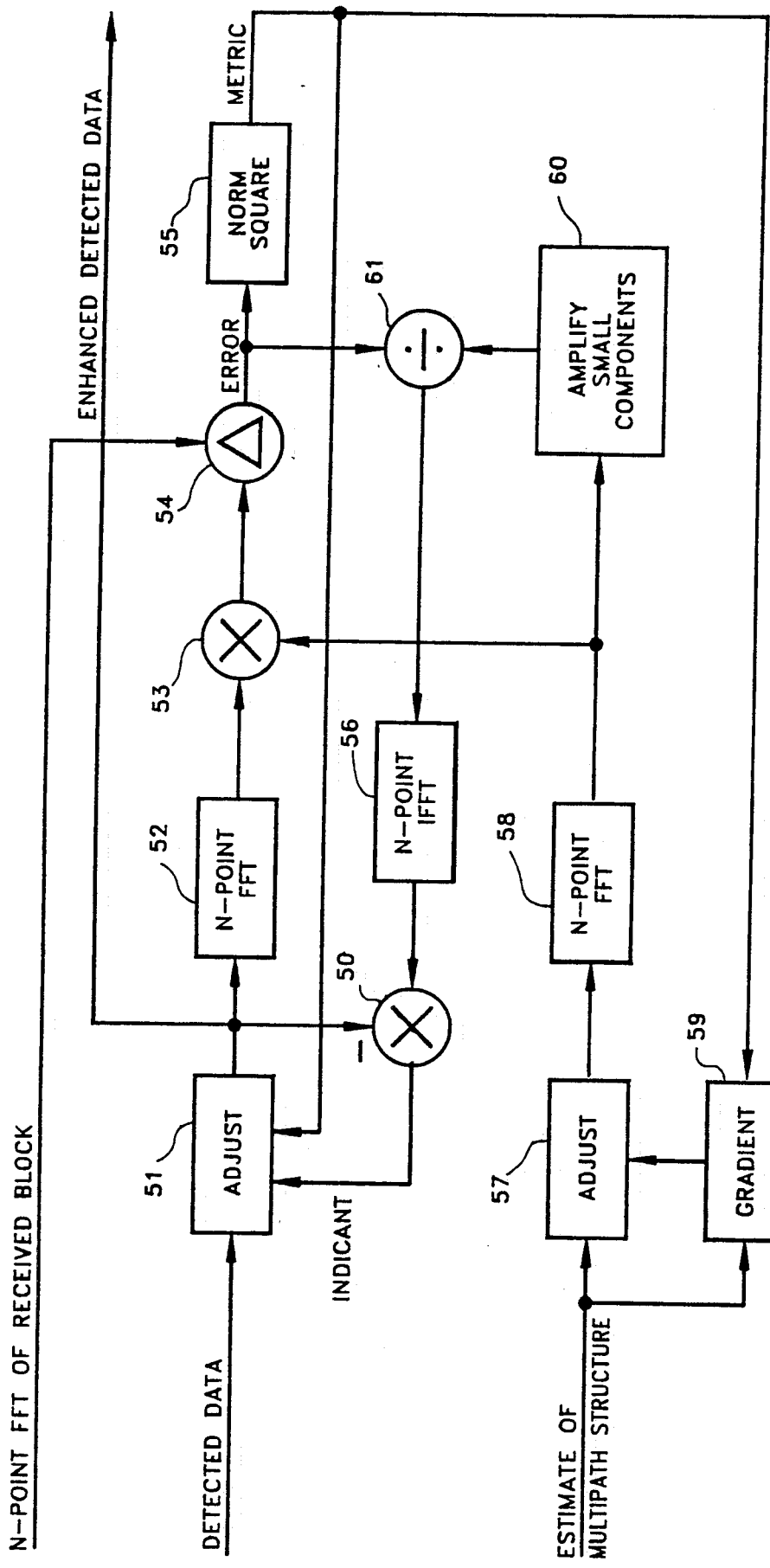
FIG. 5 is a block diagram of the enhanced method for detection of a multipath signal using an indicant based on the components of the error vector.

FIG. 5 shows an indicant obtained from the error vector by dividing 61 it by the N-point FFT 58 of the estimated channel multipath-structure, with small components amplified 60 to avoid noise amplification, then taking the IFFT 56 and multiplying 50 by $-/+1$ according to whether the corresponding component of data is positive or negative. This error-component indicant is quite direct feedback of the error signal and high values indicate relatively high likelihood of error in the corresponding bits. Used in the same way as the other indicants to enhance the detected data, its performance is nearly the same as that of the gradient indicant, but it requires significantly less processing.

Two refinements are useful to the enhanced as well as the basic method: (1) The pattern portion of the block is fixed at the proper values at the first estimate and remains so during all adjustments of the data; (2) The estimate of the multipath-structure is subject to a threshold at each iteration as it is for the basic method.

The bit synchronization and block synchronization required for operation of the invention are readily obtained by the following procedure. The sampling of the received waveform is set to give samples of its complex-envelope at an integer k times the symbol rate. Then the basic method for detection is performed using every k-th sample. If the norm-square of the difference between the analog estimate that the basic method gives for the 2M pattern symbols of a block and their known values is sufficiently close to zero, synchronization is declared; otherwise the trial synchronization is slipped by one sample and the procedure performed again.

After the initial synchronization is obtained, it is refined by testing for synchronization at a delay of one sampling interval, then using the better result. Excellent synchronization will result with $k=4$. Fine adjustment of synchronization can be obtained by monitoring the quality of synchronization one (high-rate) sampling interval early and one interval late using the norm-square of the error of the analog estimate of the known pattern bits as the criterion of quality.

Care has been taken in the design of the invention to ensure that it is not unduly sensitive to modelling assumptions. Thus, it will tolerate the vagaries of real fading channels without untoward results. For one example, after a signal drop-out due to deep fading of all propagation paths, the invention can satisfactorily detect the first signal block that has signal-to-noise ratio adequate for synchronization. For another, the processing is essentially independent of the multipath-structure of the channel, so the processor will not become overloaded for any multipath-structure.

Proper operation of the novel features of the basic and enhanced methods for detection offered by the invention has been verified by their implementation on a personal computer. Sampled values of QPSK-modulated signals have been generated with each block containing K symbols (complex numbers in the case of QPSK) preceded and followed by M pattern symbols. Propagation through a multipath channel with as many as M paths has been simulated. White, gaussian noise was then added to the output of the simulated channel. The automatic-gain-control feature of any practical radio receiver has been simulated by adjusting the signal-level on a block-by-block basis according to the total energy of the block. Assuming synchronization, all the processing required to realize the basic and enhanced methods described above has been implemented for QPSK modulation in a FORTRAN program called SIGCOAG that is included in the Appendix.

Figure 6:
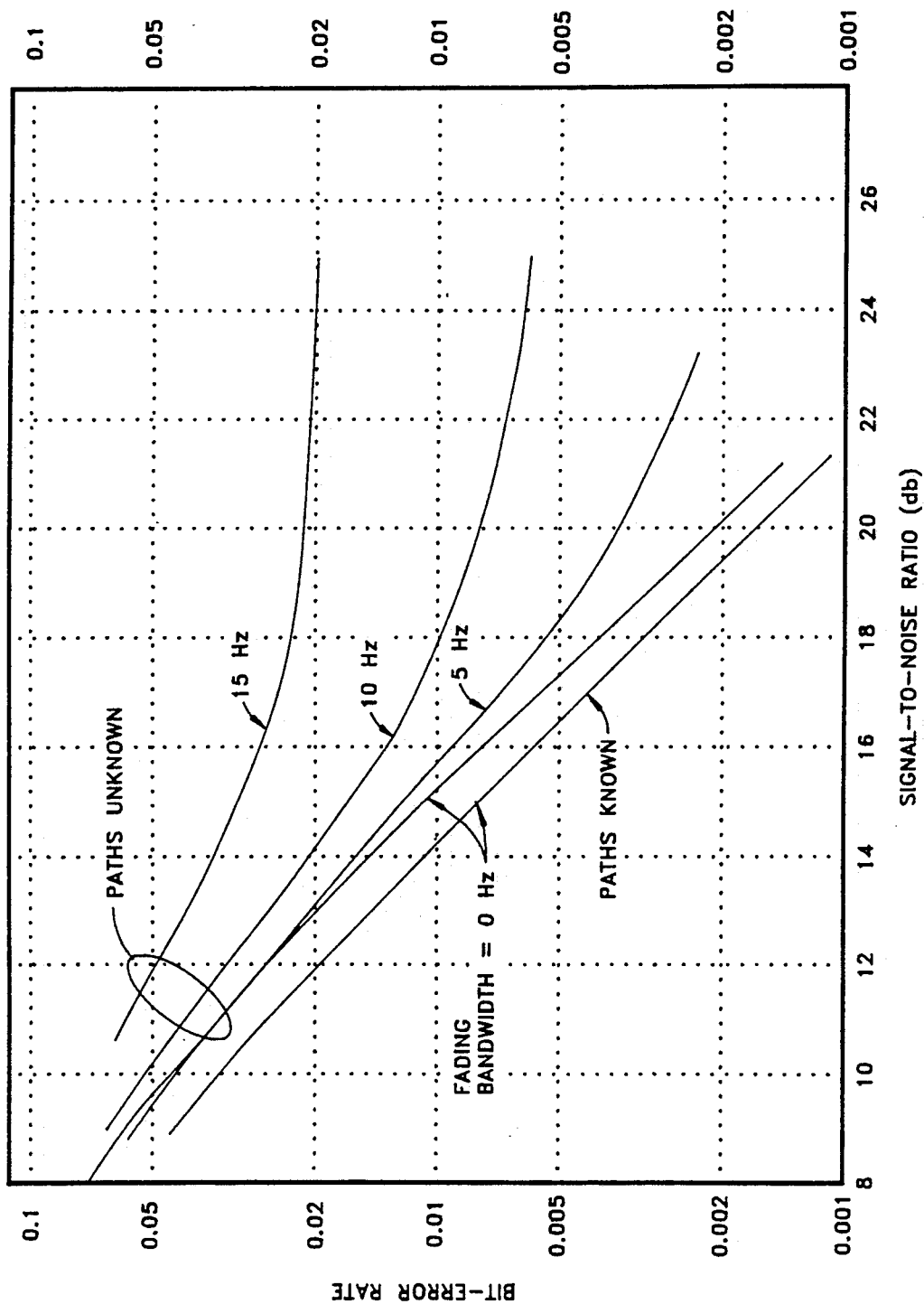
FIG. 6 shows the performance of the basic method for detection of a signal received from a channel with two Rayleighfading paths of equal average strength.
Figure 7:
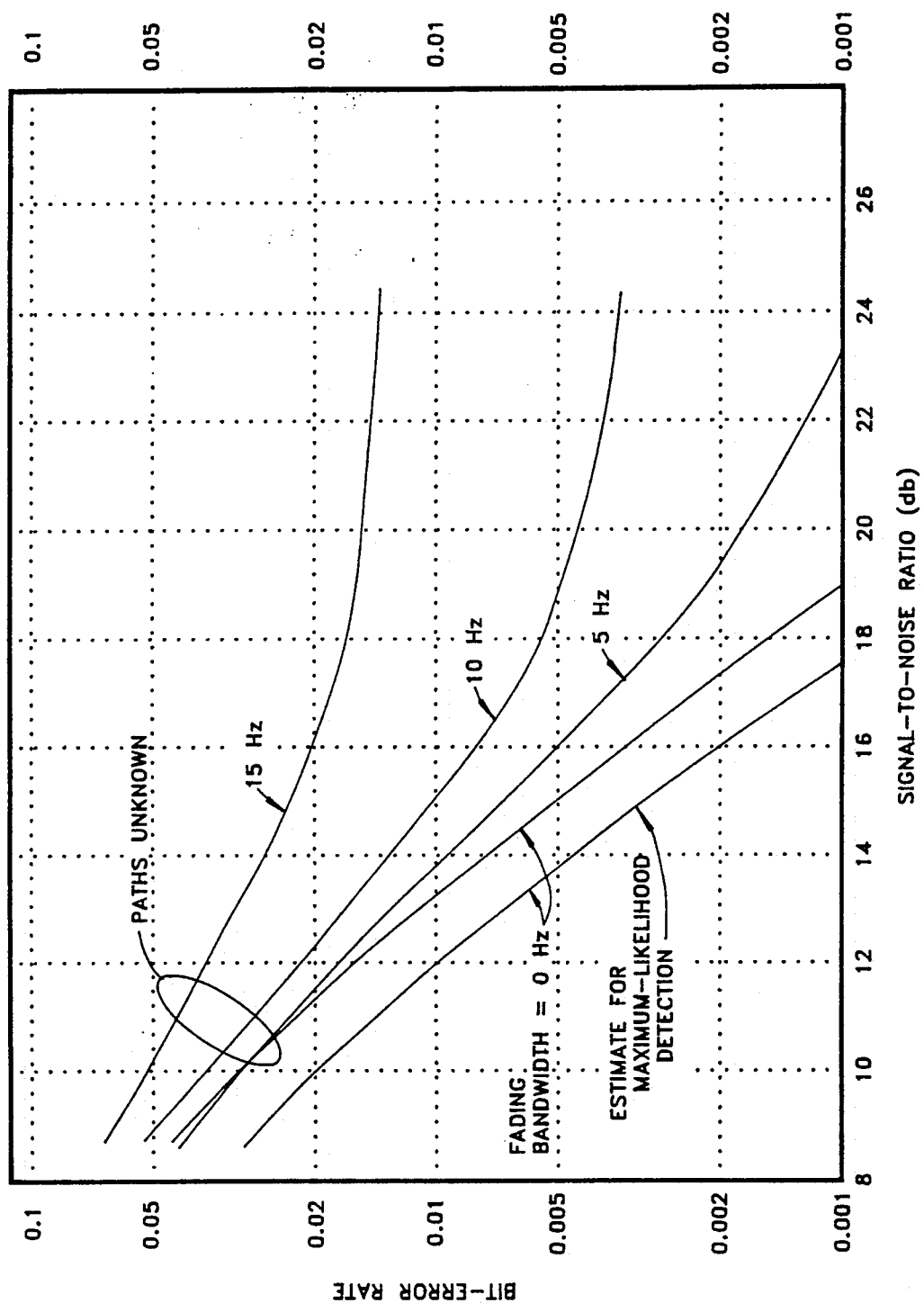
FIG. 7 shows the performance of the enhanced method for detection of a signal received from a channel with two Rayleighfading paths of equal average strength using an indicant based on the components of the error vector.

The program SIGCOAG also generates and summarizes statistics on the performance of the invention. Example results are given for 2400-baud operation at HF in FIGS. 6 and 7. An equal-strength two-path Rayleigh-fading channel as modelled by Watterson (Reference 6) has been assumed. The bit-error rate is shown as a function of the signal-to-noise ratio for several values of the fading bandwidth in FIG. 6 for the basic method of detection, and in FIG. 7 for the enhanced method.

Comparison of these results with data available in the literature (cf. References 4 and 5) on the performance achieved by other equalization techniques indicates that the invention achieves superior performance, especially for rapidly fading channels.

APPENDIX

```
      PROGRAM SIGCOAG
C SIGCOAG SIMULATES THE ESSENCE OF THE SIGNAL COAGULATOR FOR QPSK.
C IT MAKES AN INITIAL ESTIMATE OF THE MULTIPATH-STRUCTURE IN THE
C FREQUNECY DOMAIN BY DIVIDING THE IRMX-POINT FFT OF THE RECEIVED
C PATTERN BY THE FFT OF THE KNOWN PATTERN.  THEN IT MAKES AN INITIAL
C ESTIMATE OF THE DATA IN THE FREQUENCY DOMAIN BY DIVIDING THE LBLK-
C POINT FFT OF THE RECEIVED BLOCK BY AN ADJUSTED ESTIMATE OF THE FFT
C OF THE PATH.
C SIGCOAG REFINES THE MULTIPATH ESTIMATE BY GRADIENT-TRACKING.  IT
C REFINES THE DATA ESTIMATE BY TESTING FOR A LOWER METRIC: ALL COMBI-
C NATIONS OF THE NCOR HIGHEST INDICANT BITS, SINGLE BITS OVER THE IN-
C DICANT RANGE L1R, DOUBLES OVER L2R, TRIPLES OVER L3R, AND STRINGS
C OF 5 BITS CENTERED ON THE NCOR HIGHEST INDICANT BITS.
C SB USES THE COMPONENTS OF AN ERROR VECTOR OR THE GRADIENT OR THE
C ABSOLUTE  VALUE OF THE DATA BITS AS THE INDICANT, ACCORDING TO AN
C INDEX THAT IS A FUNCTION OF THE INDEX OF PATH REFINEMENTS.
      PARAMETER (LBLK=64,IRMX=8,MDIG=2*LBLK,MPAT=2*IRMX,MBIT=MDIG-2*MP
     +AT,LBM=LBLK-1,IRM=IRMX-1,MP=2)
C LBLK IS THE LENGTH OF A BLOCK IN SYMBOLS
C IRMX IS THE MAXIMUM LENGTH IN SYMBOLS OF THE CHANNEL IMPULSE RESPONSE
C THERE ARE 2 BINARY DIGITS PER SYMBOL (QPSK)
C A PATTERN OF IRMX SYMBOLS PRECEDES AND FOLLOWS EACH BLOCK OF DATA
C SYMBOLS
C MP IS THE NUMBER OF ACTIVE PATHS
      INTEGER KPAT(MPAT),KBIT(MBIT),KDIG(-MPAT+1:MDIG+MPAT),LDIG(MDIG),
     +IERR(MDIG),LX(0:MDIG-1),KPX(0:IRM),JPX(MP),
     +KX(0:MDIG-1),NX(0:MDIG-1),NEI(0:MPAT-1),INX(0:MDIG-1),IXNX(0:3),
     +JX(0:MDIG-1),MERR(0:3),LER(0:3),MLER(0:3)
      COMPLEX SYM(-IRMX:LBM+IRMX),ZYM(0:LBM+IRMX),RYM(0:LBM+IRMX),SP(0:I
     +RM),ST(0:LBM),ASJ(MP,0:LBM+IRMX),STPRE(0:IRM),STPOST(0:IRM),ERPRE S
     +T(0:IRM),ERPOEST(0:IRM),XSYM(0:LBM),XRYM(0:LBM),
     +ESYM(0:LBM),CERR(0:LBM),CEJ(0:LBM),TFP(0:IRM),XTFP(0:IRM),
     +RFP(0:IRM),XRFP(0:IRM),ZST(0:IRM),EST(0:IRM),XEST(0:IRM),
     +XFST(0:LBM),FST(0:LBM),YSYM(0:LBM),ERREST(0:IRM),XVYN(0:LBM) ,
     +CSYM(0:LBM),XCYM(0:LBM),XNEST(0:LBM),XBST(0:LBM),DYM(0:LBM),
     +XDYM(0:LBM),XERE(0:LBM),VYN(0:LBLK+IRM),XGST(0:LBM),EX(0:LBL K),
     +ENV(MP),AD(0:LBM),ADR(0:LBM),ADI(0:LBM),AST(0:IRM),BST(0:LBM ),CES
      REAL EBIT(0:MDIG-1),PDR(0:IRM),PDI(0:IRM),SMEB(0:MDIG-1),
     +CUMEPR(0:3),CUMEPO(0:3),RMSPR(0:3),RMSPO(0:3),PBLK(MP),YMS(MP),
     +CPWR(MP),APWR(MP),APWRDB(MP),XLPD(0:MDIG-1),RLPD(0:MDIG-1),
     +RMSPRE(0:3),RMSPOE(0:4),DYME(0:MDIG-1),XIND(0:MDIG-1),
     +SMEF(0:MDIG-1),SMEG(0:MDIG-1),BSYM(0:MDIG-1),TKOUNT(0:3),BER(0:3
     +),BERML(0:3),BERMML(0:3)
      CHARACTER PATHTYP*14,SDIR(0:3)*9
      COMMON CEJ
      EQUIVALENCE (SP,ST),(EST,FST),(ESYM,EBIT),(AST,BST),(DYM,DYME),(BS
     +YM,CSYM)
      DATA TPI/6.283185307/,ST/LBLK*(0.,0.)/,FST/LBLK*(0.,0.)/,BST/LBLK*
     +(0.,0.)/,STPRE/IRMX*(0.,0.)/,STPOST/IRMX*(0.,0.)/
      OPEN(1,FILE='SIGCOAG.DAT')
      READ(1,*) SNRDB1,SNRDB2,DDB
C SNRDB1 AND SNRDB2 ARE THE LIMITING VALUES OF SIGNAL-TO-NOISE RATIO
C IN DB AND DDB IS THE INCREMENT FOR CASES TO BE RUN
      READ(1,*) NCOR,L1R,L2R,L3R,NSTG
C NCOR IS THE NUMBER OF CORRELATION-BITS
C L(I)R IS THE IS THE RANGE FOR THE I-TUPLE CHECK
C NSTG IS THE NUMBER OF STRING-BITS
      READ(1,*) IXNX
C IXNX KEYS THE TYPE OF INDICANT: 0-ABS VAL, 1 GRAD, 2-ERROR COMP
      READ(1,*) NPR
C NPR IS THE NUMBER OF PATH REFINEMENTS
      READ(1,*) LTB,SR,NP
```

```
C LTB IS THE LENGTH OF THE TEST IN BLOCKS, SR IS THE SAMPLE RATE, NP IS
C THE NUMBER OF POLES IN THE BUTTERWORTH FILTER
      READ(1,*) INHFAD,FADBW1,FADBW2,DBW
C INHFAD ~=0 INHIBITS FADING, FADBWI ARE THE LIMITS OF THE FADING BAND-
C WIDTH, DBW IS THE INCREMENT OF FADING BANDWIDTH
      READ(1,*) ML,KP
C ML ~=0 IS MAX LIKELIHOOD ESTIMATE, KP ~=0 FOR KNOWN PATH
      READ(1,*) FF,THRC,IPAUSE
C FF IS THE BOOST CONSTANT, FF IS THE THRESHOLD CONSTANT, IPAUSE ~=0
C CAUSES PAUSE AFTER EACH CASE
      READ(1,*) DS,DELTA,AL0
C DS IS SYMBOL INCREMENT FOR PARTIAL DERIVATIVES, DELTA IS PATH IN-
C CREMENT FOR PARTIAL DERIVATIVES, AL0 IS THE INITIAL VALUE OF ALPHA
      IF(INHFAD.EQ.0) THEN
         WRITE(6,50) LTB
   50 FORMAT(/5X,I4,' BLOCK SIMULATION OF THE SIGNAL COAGULATOR WITH RAY
     +LEIGH FADING'/)
      ELSE
         WRITE(6,150) LTB
  150 FORMAT(/5X,I4,' BLOCK SIMULATION OF THE SIGNAL COAGULATOR WITH NO
     +FADING'/)
      END IF
      IF(KP.EQ.0) PATHTYP=' UNKNOWN PATHS'
      IF(KP.NE.0) PATHTYP=' KNOWN PATHS  '
      IF(ML.NE.0) WRITE(6,*) ' MAXIMUM-LIKELIHOOD COMPUTATION'
      WRITE(6,62) SR,LBLK,MP,PATHTYP,SNRDB1,SNRDB2,DDB
   62 FORMAT(' SAMPLE RATE = ',F5.0,'   BLOCK LENGTH =',I4,' SYMBOLS',4X
     +,I2,A14,4X,'NOMINAL SNR =',2F6.1,F5.1)
      WRITE(6,87) NCOR,L1R,L2R,L3R,NSTG
   87 FORMAT(I2,'-BIT CORRELATION    SINGLE-CHECK RANGE =',I3,' DOUBL
     +E-CHECK RANGE =',I3,'   TRIPLE-CHECK RANGE =',I3,'  STRING-CHEC
     +K =',I2)
      IF(NPR.GE.1) THEN
         WRITE(6,64) FF,THRC,NPR,DELTA,AL0,DS
   64 FORMAT(' BOOST CONSTANT =',F6.4,'    THRESHOLD CONSTANT =',F6.4,I
     +6,' PATH REFINEMENTS    DELTA =',F5.3,'    ALPHA0 =',F5.3,'
     +DS =',F5.3)
         DO 131 I=0,NPR
         IF(IXNX(I).EQ.0) SDIR(I)='BIT-VALUE'
         IF(IXNX(I).EQ.1) SDIR(I)='GRADIENT '
  131    IF(IXNX(I).EQ.2) SDIR(I)='COMPONENT'
         WRITE(6,991) (SDIR(I),I=1,NPR)
  991 FORMAT(' SEARCH DIRECTED BY ',3A10)
      ELSE
         WRITE(6,164) FF,THRC,NPR
  164 FORMAT(' BOOST CONSTANT =',F6.4,'    THRESHOLD CONSTANT =',F6.4,I
     +6,' PATH REFINEMENTS')
      END IF
C POSTULATE THE FIXED PATTERN
      READ(1,*) KPAT
      WRITE(6,98) KPAT
   98 FORMAT(/' FIXED PATTERN ',64I3)

C GENERATE THE COMPLEX ENVELOPE OF THE FIXED PATTERN AND TAKE ITS FFT
      DO 12 I=0,IRM
   12    TFP(I)=CMPLX(KPAT(2*I+1),KPAT(2*I+2))
      CALL FFT(TFP,XTFP,IRMX,1)

C POSTULATE THE MULTIPATH STRUCTURE
      READ(1,*) SP
C NORMALIZE THE POSTULATED MULTIPATH STRUCTURE
      CALL NORMAL(SP,IRMX,1.,XX)
      WRITE(6,83)
```

```
   83 FORMAT(' MULTIPATH STRUCTURE POSTULATED')
      WRITE(6,94) SP
      KPQ=0
      DO 17 I=0,IRM
        IF(SP(I).EQ.(0.,0.)) THEN
          KPX(I)=0
        ELSE
          KPX(I)=KPQ+1
          JPX(KPX(I))=I
          KPQ=KPQ+1
        END IF
   17 CONTINUE
C  KPX PROVIDES THE INDEX OF THE ACTIVE COMPONENTS OF THE PATH FOR THE
C  FADING SUBROUTINE;  JPX(J) IS THE LOCATION OF THE JTH ACTIVE PATH

C  FRAME THE DOUBLE FIXED PATTERN AROUND PSEUDO-RANDOM DATA
      DO 2 I=1,MPAT
        KDIG(I)=KPAT(I)
        KDIG(I-MPAT)=KPAT(I)
        KDIG(MPAT+MBIT+I)=KPAT(I)
   02   KDIG(2*MPAT+MBIT+I)=KPAT(I)

C  PRECOMPUTE SOME CONSTANTS
      DO 52 J=0,LBM
   52 CEJ(J)=CEXP(CMPLX(0.,-J*TPI/LBLK))

C  DEFINE THE FADING BANDWIDTHS TO BE USED
      DO 100 FADBW=FADBW1,FADBW2,DBW
      IFX=0
      WRITE(6,162) NP,FADBW
  162 FORMAT(I2'-POLE BUTTERWORTH FILTER     FADING BANDWIDTH = ',F5.2,'
     + HZ')

C  DEFINE THE SIGNAL-TO-NOISE RATIOS TO BE USED
      DO 100 SNRDB=SNRDB1,SNRDB2,DDB
      WRITE(6,88) SNRDB
   88 FORMAT(/' INPUT SIGNAL-TO-NOISE RATIO =',F6.2,' DB')

C  INITIALIZE SOME VALUES
      DO 37 I=0,NPR
        CUMEPR(I)=0.
        CUMEPO(I)=0.
        MERR(I)=0
        LER(I)=0
        MLER(I)=0
   37   TKOUNT(I)=0.
      DO 137 J=1,MP
  137   CPWR(J)=0.
      MKOUNT=0
      HTSQE=0.
      NBLK=1
      LL=-IRMX
      LM=0
      LU=LBLK+IRM
C  COMPUTE THE RMS VOLTAGE OF EACH COMPONENT OF NOISE, ASSUMING UNITY
C  SIGNAL POWER
      PNDB=-SNRDB
      PN=10.**(.1*PNDB)
      VN=SQRT(PN)
      GO TO 11

C  STATEMENT #10 IS THE ITERATION POINT FOR SUCCESSIVE BLOCKS
   10 NBLK=NBLK+1
      IF(FADBW.EQ.0.) GO TO 11
```

```
C   REPOSITION PREVIOUSLY GENERATED VALUES FOR THE NEW BLOCK
        DO 15 I=0,IRM
          SYM(I)=SYM(LBLK+I)
          ZYM(I)=ZYM(LBLK+I)
          RYM(I)=RYM(LBLK+I)
15        VYN(I)=VYN(LBLK+I)
        LL=IRMX
        LM=IRMX
C   GENERATE A BLOCK OF MBIT PSEUDO-RANDOM DATA BITS
11      DO 1 I=1,MBIT
          KBIT(I)=1
01        IF(RANFD().GE..5) KBIT(I)=-1
        DO 3 I=MPAT+1,MPAT+MBIT
03        KDIG(I)=KBIT(I-MPAT)

C   GENERATE THE COMPLEX ENVELOPE OF THE TRANSMITTED SYMBOL BLOCK
        DO 4 I=LL,LU
04        SYM(I)=CMPLX(KDIG(2*I+1),KDIG(2*I+2))
C   SYM IS THE COMPLEX ENVELOPE OF THE SIGNAL TRANSMITTED
        CALL FFT(SYM(0),XSYM,LBLK,1)

C   GENERATE THE COMPOSITE SIGNAL BY CONVOLVING THE COMPLEX ENVELOPE OF
C   THE SOURCE WITH THE TIME-VARYING PATH-STRUCTURE OF THE MULTIPATH
C   CHANNEL
        IF(FADBW.NE.0.) THEN
          CALL FADING(SP,IRM,JPX,ASJ(1,LM),YMS,MP,LU-LM+1,FADBW,NP,SR,IFX)
        ELSE
          CALL RAYLEIGH(SP,IRM,JPX,ENV,MP,INHFAD)
        END IF
        AP=0.
        DO 16 J=1,MP
          IF(FADBW.NE.0.) PBLK(J)=YMS(J)/LBLK
          IF(FADBW.EQ.0.) PBLK(J)=ENV(J)*CONJG(ENV(J))
          CPWR(J)=CPWR(J)+PBLK(J)
          AP=AP+CPWR(J)
          APWRDB(J)=10.*ALOG10(CPWR(J)/NBLK)

IF(FADBW.NE.0.) THEN
            STPRE(JPX(J))=ASJ(J,IRMX)
            STPOST(JPX(J))=ASJ(J,LBM-IRMX)
          ELSE
            STPRE(JPX(J))=ENV(J)
            STPOST(JPX(J))=ENV(J)
          END IF
16      CONTINUE
        APDB=10.*ALOG10(AP/NBLK)
        DO 5 I=LM,LU
          ZYM(I)=0.
          DO 5 J=I,I-IRMX+1,-1
            IF (KPX(I-J).EQ.0) GO TO 5
            IF(FADBW.NE.0.) THEN
              ZYM(I)=ZYM(I)+SYM(J)*ASJ(KPX(I-J),I)
            ELSE
              ZYM(I)=ZYM(I)+SYM(J)*ENV(KPX(I-J))
            END IF
05        CONTINUE
C   ZYM IS THE COMPLEX ENVELOPE OF THE COMPOSITE SIGNAL RECEIVED
        CALL NORM(ZYM,ZYMNSQ,ZYMASQ,RMSZ,LBLK)

C   ADD GAUSSIAN NOISE TO THE COMPOSITE SIGNAL TO COMPLETE FORMATION OF
C   THE RECEIVED SIGNAL
        IF(SNRDB.LT.100.) THEN
          DO 7 I=LM,LU
            VYN(I)=VN*CMPLX(RNDNRM('NOISE   '),RNDNRM('NOISE   '))
```

```
   07     RYM(I)=ZYM(I)+VYN(I)
          ELSE
             DO 107 I=LM,LU
  107           RYM(I)=ZYM(I)
          END IF
          RRP=RR
          CALL NORMAL(RYM(LM),LU-LM+1,FLOAT(LU-LM+1),RR)
C  RYM IS THE COMPLEX ENVELOPE OF THE RECEIVED WAVEFORM
          IF(SNRDB.GE.100.) GO TO 177
          DO 111 I=0,LBM
  111     VYN(I)=RR*VYN(I)
          CALL NORM(VYN,VNSVYN,ANSVYN,RMSN,LBLK)
          PZDB=10.*ALOG10(.5*ZYMASQ*RR*RR)
          PMDB=10.*ALOG10(.5*ANSVYN)
  177     SNRIN=PZDB-PMDB
          WRITE(6,84) NBLK,PZDB,PMDB,SNRIN
   84     FORMAT(/' BLOCK',I5,'      SIGNAL POWER',F6.2,' DB     NOISE POWER'
         +,F7.2,' DB     SNR',F7.2,' DB')
          WRITE(6,184) (10.*ALOG10(PBLK(J)),J=1,MP)
  184     FORMAT(' RELATIVE PATH STRENGTHS IN DB',5F8.2)
          WRITE(6,*) 'PATH STRUCTURE AT START AND END OF INFORMATION BITS'
          WRITE(6,71) (RR*STPRE(JPX(J)),J=1,MP)
          WRITE(6,71) (RR*STPOST(JPX(J)),J=1,MP)
   71     FORMAT(8(2X,2F7.3))
          CALL FFT(VYN,XVYN,LBLK,1)
          CALL FFT(RYM,XRYM,LBLK,1)

C  FORM A BLOCK OF THE AVERAGE OF THE SECOND OCCURENCES OF THE RE-
C  CEIVED PATTERN SURROUNDING A DATA BLOCK AND CALCULATE AN INITIAL
C  ESTIMATE OF THE MULTIPATH STRUCTURE OF THE CHANNEL
          IF((NBLK.EQ.1).OR.(FADBW.EQ.0.)) RRP=RR
          IF((KP.EQ.0).AND.(ML.EQ.0)) THEN
             DO 13 I=0,IRM
   13           RFP(I)=(9*RR/RRP*RYM(I)+7*RYM(LBLK+I))/16
             CALL FFT(RFP,XRFP,IRMX,1)
             DO 14 I=0,IRM
   14           XEST(I)=XRFP(I)/XTFP(I)
             CALL FFT(XEST,EST,IRMX,-1)
             CALL THREST(EST,EST,THRC,IRMX,IXP,NNP)
          ELSE
             DO 113 I=0,IRM
  113           EST(I)=RR*(9*RR/RRP*STPRE(I)+7*STPOST(I))/16
             CALL THREST(EST,ZST,THRC,IRMX,IXP,NNP)
          END IF
          NEIX=-1
          IPR=-1

C  STATEMENT #27 IS THE REENTRY POINT FOR ESTIMATE(S)
   27     IPR=IPR+1
          IF((KP.EQ.0).AND.((ML.EQ.0).OR.(IPR.GE.1))) THEN
             WRITE(6,*) 'CHANNEL MULTIPATH STRUCTURE ESTIMATED BY RECEIVER'
          ELSE
             WRITE(6,*) 'CHANNEL MULTIPATH STRUCTURE ASSUMED BY RECEIVER'
          END IF
          WRITE(6,94) EST
          DO 19 I=0,IRM
             ERPREST(I)=EST(I)-RR*STPRE(I)
   19        ERPOEST(I)=EST(I)-RR*STPOST(I)
          CALL NORM(ERPREST,ERPRNSQ,ERPRN,RMSPRE(IPR),IRMX)
          CALL NORM(ERPOEST,ERPONSQ,ERPON,RMSPOE(IPR),IRMX)
          WRITE(6,91) IPR,SDIR(IPR),RMSPRE(IPR),RMSPOE(IPR)
   91     FORMAT(' PATH EST',I2,'   IND: 'A9,'   RMS PATH-ERROR: PRE-INFO',F
         +7.4,', POST-INFO',F7.4)
          CUMEPR(IPR)=CUMEPR(IPR)+ERPRN
          CUMEPO(IPR)=CUMEPO(IPR)+ERPON
```

```
      CALL FFT(FST,XFST,LBLK,1)
      CALL NORM(XFST,XFSTNS,XFSTN,RMSXST,LBLK)

C MODIFY THE TRANSFORM OF THE ESTIMATED PATH STRUCTURE TO AVOID
C NOISE AMPLIFICATION IN MAKING AN ESTIMATE OF THE DATA
      PXFSTN=FF*SQRT(XFSTNS/LBLK)
      DO 108 I=0,LBM
         XGST(I)=XFST(I)
         CA=CABS(XFST(I))
         IF(CA.EQ.0.) THEN
            XGST(I)=PXFSTN
            GO TO 108
         END IF
         IF(CA.LT.PXFSTN) XGST(I)=PXFSTN/CA*XFST(I)
 108  CONTINUE

C AFTER A DATA-ESTIMATE BASED ON THE ENTIRE BLOCK HAS BEEN MADE, USE
C THE PREVIOUS ESTIMATE FOR SUBSEQUENT REFINEMENTS
      IF(IPR.GE.2) GO TO 127

IF(((KP.EQ.0).AND.(NNP.EQ.1)).OR.((KP.NE.0).AND.(MP.EQ.1))) THEN
         CES=CONJG(EST(IXP))/CABS(EST(IXP))
         DO 6 I=0,LBM
 06         ESYM(I)=CES*RYM(I+IXP)
      ELSE
         DO 8 I=0,LBM
 08         YSYM(I)=XRYM(I)/XGST(I)
C YSYM IS AN ESTIMATE OF THE TRANSFORM OF THE TRANSMITTED SIGNAL
         CALL NORM(XGST,XGSTNS,XGSTN,RMSXST,LBLK)

C ESTIMATE THE TRANSMITTED SYMBOLS
         CALL FFT(YSYM,ESYM,LBLK,-1)
      END IF
C FORCE THE PATTERN PORTIONS OF THE ESTIMATE TO BE CORRECT
      DO 35 I=0,MPAT-1
         EBIT(I)=KPAT(I+1)
 35      EBIT(MBIT+MPAT+I)=KPAT(I+1)

C IF MAX-LIKELIHOOD COMPUTATION, FORCE DATA PORTIONS OF THE ESTIMATE
C TO BE CORRECT INITIALLY
      IF((ML.NE.0).AND.(IPR.LE.1)) THEN
         DO 135 I=MPAT,MBIT+MPAT-1
 135        EBIT(I)=KDIG(I+1)
      END IF

C DETECT THE BITS, AND IDENTIFY THE ERRORS (FOR STATISTICAL PURPOSES)
      DO 57 I=1,MDIG
         LDIG(I)=1
 57      IF(EBIT(I-1).LT.0.) LDIG(I)=-LDIG(I)
C THE DETECTED SIGNAL LDIG IS OBTAINEDED BY HARD-LIMITING EBIT, THE
C REAL BIT STREAM EQUIVALENT TO THE COMPLEX ESYM.

C OBTAIN THE TRANSFORM OF THE DETECTED SIGNAL TRANSMITTED OVER THE
C CHANNEL AND COMPUTE THE DIFFERENCE FROM THAT RECEIVED
      DO 44 I=0,LBM
 44      CSYM(I)=CMPLX(LDIG(2*I+1),LDIG(2*I+2))
      CALL FFT(CSYM,XCYM,LBLK,1)
 127  DO 45 I=0,LBM
 45      XNEST(I)=XRYM(I)-XCYM(I)*XFST(I)
C XNEST ESTIMATES THE COMPOSITE "NOISE" DUE TO CHANNEL NOISE AND
C LACK OF KNOWLEDGE OF THE PATH STRUCTURE

C COMPUTE ENSQN, THE NORM-SQUARED OF THE ESTIMATED NOISE.  THIS IS
C THE "METRIC" THAT WILL BE USED TO ENHANCE DETECTION.
      CALL NORM(XNEST,ENSQN,ENN,RMSE,LBLK)
      IF(IPR.LE.1) DNSQN=ENSQN
```

```
            IF((IPR.EQ.0).AND.(NPR.NE.0)) THEN
              DO 102 I=0,MDIG-1
                XIND(I)=0.
 102            INX(I)=0
              GO TO 101
            END IF

IF(IXNX(IPR).EQ.0) THEN
C    COMPUTE THE ABSOLUTE BIT-VALUES
              DO 120 J=MPAT,MDIG-MPAT-1
 120            XIND(J)=ABS(EBIT(J))
C    HERE XIND IS THE INDICANT DETERMINED BY THE ABSOLUTE BIT-VALUES
C    RANK THE BITS IN ORDER OF CONFIDENCE
              CALL SANK(XIND(MPAT),SMEB,MBIT,MBIT,LX)
C    ONLY THE L1R SMALLEST COMPONENETS OF XIND ARE NEEDED FOR SIGNAL
C    COAGULATION
C    LX(I) GIVES THE LOCATION OF THE ITH SMALLEST ABSOLUTE BIT-VALUE
C    RELATIVE TO MPAT
              DO 121 J=0,MBIT-1
                IT=LX(J)+MPAT
                NX(J)=IT
C    NX(J) GIVES THE LOCATION OF THE JTH SMALLEST ABSOLUTE BIT-VALUE
 121            INX(IT)=J
C    INX(IT) GIVES THE RANK OF THE IT BIT
            END IF

IF(IXNX(IPR).EQ.1) THEN
C    COMPUTE THE GRADIENT OF THE METRIC WRT THE DETECTED (+/-1) BITS
              CALL SYMGRAD(CSYM,XCYM,XRYM,XFST,ENSQN,LBLK,LBM,MBIT,DS,XIND,MP
     +AT,EBIT)
C    HERE XIND IS THE INDICANT DETERMINED BY THE GRADIENT
C    RANK THE PARTIAL DERIVATIVES ADJUSTED BY THE SIGN OF THE BIT-VALUE
              CALL SANK(XIND(MPAT),XLPD,MBIT,MBIT,KX)
              DO 249 I=0,MBIT-1
 249            KX(I)=KX(I)+MPAT
C    ONLY THE L1R LARGEST COMPONENTS OF THIS XIND ARE NEEDED FOR SIGNAL-
C    COAGULATION
              DO 244 I=0,MBIT-1
                NX(I)=KX(MBIT-1-I)
 244            RLPD(I)=XLPD(MBIT-1-I)
C    RLPD(I) GIVES THE ITH LARGEST PARTIAL DERIVATIVE
C    NX(I) GIVES THE LOCATION OF THE ITH LARGEST PARTIAL
              DO 122 I=0,MBIT-1
                IT=NX(I)
 122            INX(IT)=I
C    INX(IT) GIVES THE RANK (FROM THE LARGEST) OF THE IT PARTIAL
            END IF

IF(IXNX(IPR).EQ.2) THEN
C    ESTIMATE THE ERROR VECTOR IN THE TIME DOMAIN
              DO 123 I=0,LBM
 123            XDYM(I)=XNEST(I)/XGST(I)
              CALL FFT(XDYM,DYM,LBLK,-1)
              DO 124 I=0,MDIG-1
 124            XIND(I)=-LDIG(I+1)*DYME(I)
C    HERE XIND IS THE INDICANT DETERMINED BY THE ERROR-COMPONENTS
              CALL SANK(XIND(MPAT),SMEF,MBIT,MBIT,JX)
              DO 149 I=0,MBIT-1
 149            JX(I)=JX(I)+MPAT
C    ONLY THE L1R LARGEST COMPONENTS OF THIS XIND ARE NEEDED FOR SIGNAL-
C    COAGULATION
              DO 144 I=0,MBIT-1
                NX(I)=JX(MBIT-1-I)
 144            SMEG(I)=SMEF(MBIT-1-I)
C    SMEG(I) GIVES THE ITH LARGEST COMPONENT
```

```
C NX(I) GIVES THE LOCATION OF THE ITH LARGEST COMPONENT
      DO 130 J=0,MDIG-1
        IT=NX(J)
130     INX(IT)=J
C INX(IT) GIVES THE RANK (FROM THE LARGEST) OF THE IT BIT
      END IF

101   CALL ERRIND('INITIAL ',ENSQN,LDIG,KDIG(1),IERR,NERR,EBIT,XIND,
     +INX,MDIG,NEI,NEIX)
      IF(NPR.EQ.0) GO TO 42
      IF(IPR.EQ.0) THEN
        IF(KP.EQ.0) CALL PATHREF(XRYM,XCYM,XFST,ADR,ADI,PDR,PDI,AST,BST,
     +XBST,EX,EST,IRM,LBM,LBLK,IXP,NNP,THRC,DELTA,ENSQN,AL0)
        GO TO 27
      END IF

42    IF(NCOR.NE.0) THEN
C CHECK ALL COMBINATIONS OF THE NCOR BITS MOST LIKELY TO BE IN ERROR
C ACCORDING TO THE INDICANT, THEN ADJUST THE BITS TO GIVE THE SMAL-
C LEST METRIC
        CALL CORRCK(CSYM,XCYM,XRYM,XFST,ENSQN,LDIG,NX,NCOR,LBLK,LBM)
      END IF
      CALL ERRIND('CORREL ',ENSQN,LDIG,KDIG(1),IERR,NERR,EBIT,XIND,
     +INX,MDIG,NEI,NEIX)

IF(L1R.NE.0.) THEN
C PERFORM SINGLE CHECKS ON THE L1R BITS MOST LIKELY TO BE IN ERROR
C ACCORDING TO THE INDICANT, AND ADJUST THE BITS TO GIVE THE SMAL-
C LEST METRIC
        CALL SINGCK(CSYM,XCYM,XRYM,XFST,ENSQN,LDIG,LBLK,LBM
     +,KOUNT,NX,NCOR,L1R)
        IF(KOUNT.GT.MKOUNT) MKOUNT=KOUNT
        TKOUNT(IPR)=TKOUNT(IPR)+KOUNT
        CALL ERRIND('SINGLE ',ENSQN,LDIG,KDIG(1),IERR,NERR,EBIT,XIND,
     +INX,MDIG,NEI,NEIX)
      END IF

IF(L2R.NE.0.) THEN
C PERFORM DOUBLE CHECKS ON THE L2R BITS MOST LIKELY TO BE IN ERROR
C ACCORDING TO THE INDICANT, AND ADJUST THE BITS TO GIVE THE SMAL-
C LEST METRIC
        CALL DOUBCK(CSYM,XCYM,XRYM,XFST,ENSQN,LDIG,LBLK,LBM,NCOR,L2R,NX)
        CALL ERRIND('DOUBLE ',ENSQN,LDIG,KDIG(1),IERR,NERR,EBIT,XIND,
     +INX,MDIG,NEI,NEIX)
      END IF

IF(L3R.NE.0.) THEN
C PERFORM TRIPLE CHECKS ON THE L3R BITS MOST LIKELY TO BE IN ERROR
C ACCORDING TO THE INDICANT, AND ADJUST THE BITS TO GIVE THE SMAL-
C LEST METRIC
        CALL TRIPCK(CSYM,XCYM,XRYM,XFST,ENSQN,LDIG,LBLK,LBM,NCOR,L3R,NX)
        CALL ERRIND('TRIPLE ',ENSQN,LDIG,KDIG(1),IERR,NERR,EBIT,XIND,
     +INX,MDIG,NEI,NEIX)
      END IF

IF(NSTG.NE.0) THEN
C CHECK ALL COMBINATIONS OF THE 5 BITS CLUSTERED AROUND THE NSTG
C BITS MOST LIKELY TO BE IN ERROR ACCORDING TO THE INDICANT, AND
C ADJUST THE BITS TO GIVE THE SMALLEST METRIC
        CALL STRGCK(BSYM,CSYM,XCYM,XRYM,XFST,ENSQN,LDIG,LX,NCOR,LBLK,LBM
     +,MPAT,MBIT)
        CALL ERRIND('STRING ',ENSQN,LDIG,KDIG(1),IERR,NERR,EBIT,XIND,
     +INX,MDIG,NEI,NEIX)
      END IF
```

```
C  COMPUTE THE ERROR OF THE ESTIMATE AND SOME STATISTICS FOR THIS PASS
       DO 39 I=0,LBM
   39    XERE(I)=XRYM(I)-XSYM(I)*XFST(I)
   94  FORMAT(8(1X,2F7.3))
       CALL NORM(XERE,XERENS,XEREN,RMSXE,LBLK)
       CALL NORM(XVYN,XVYNNS,XVYNN,RMSXV,LBLK)
       WRITE(6,63) ENSQN,XERENS,XVYNNS
   63  FORMAT(' NORM-SQUARE OF NOISE ESTIMATES',3F12.2)
       SQERR=0.
       DO 9 I=0,LBM
       CERR(I)=ESYM(I)-SYM(I)
   09  SQERR=SQERR+CERR(I)*CONJG(CERR(I))
       SNROUT=1.E+6
       AVNP=SQERR/MBIT
       IF(AVNP.LE.0.) GO TO 148
       SNROUT=-10.*ALOG10(AVNP)
  148  DESNR=SNROUT-SNRIN
       NMLE=0
       WRITE(6,58) NERR,AVNP,DESNR,SNROUT
   58  FORMAT(I4,' ERRORS       MSE',F7.4,'       DELTA SNR',F6.2,' DB
      + EFFECTIVE SNR',F6.2' DB')
       MERR(IPR)=MERR(IPR)+NERR
       IF(ENSQN.LT.XERENS) LER(IPR)=LER(IPR)+NERR
C  A 'LIKELIHOOD ERROR' OCCURS IF THE METRIC IS LESS THAN THAT FOR THE
C  TRANSMITTED WORD
       IF(ENSQN.LT.XVYNNS) MLER(IPR)=MLER(IPR)+NERR
C  A 'MAXIMUM-LIKELIHOOD ERROR' OCCURS IF THE METRIC IS LESS THAN THE
C  NORM-SQUARE OF THE NOISE
       WRITE(6,33) NBLK,MERR(IPR),LER(IPR),MLER(IPR)
   33  FORMAT(' AT',I5,' BLOCKS:     ',I4,' ERRORS      ',I4,' LIK ERRORS
      +     ',I4,' MAX-LIK ERRORS')
       AVKOUNT=0.
       IF((NPR.EQ.0).AND.(L1R.GT.0)) AVKOUNT=TKOUNT(IPR)/(MDIG*NBLK)
       IF(NPR.GT.0) AVKOUNT=TKOUNT(IPR)/(2*NPR*LBLK*NBLK)
       BER(IPR)=FLOAT(MERR(IPR))/(NBLK*MBIT)
       WRITE(6,159) AVKOUNT,SNRDB+APDB,BER(IPR)
  159  FORMAT(' AVE SING CHKS =',F7.2,'       ADJUSTED SNR =',F6.2' DB
      +RUNNING BER =',F8.5)

IF(IPR.LT.NPR) THEN
C  UNLESS IT HAS ALREADY BEEN DONE NPR TIMES, REFINE THE ESTIMATE OF
C  THE MULTIPATH STRUCTURE OF THE CHANNEL, USING THE CURRENT ESTIMATE
C  OF THE SIGNAL
       IF(KP.EQ.0) CALL PATHREF(XRYM,XCYM,XFST,ADR,ADI,PDR,PDI,AST,BST,
      +XBST,EX,EST,IRM,LBM,LBLK,IXP,NNP,THRC,DELTA,ENSQN,AL0)
       GO TO 27
       END IF

C  COMPUTE CUMULATIVE STATISTICS AT THE END OF A BLOCK
       HTSQE=HTSQE+AVNP
       WRITE(6,158) APWRDB,APDB
  158  FORMAT(' CUMULATIVE PATH STRENGTHS, TOTAL STRENGTH IN DB ',6F6.2)
       IF(NBLK.LT.LTB) GO TO 10
C  COMPUTE SUMMARY STATISTICS AT THE END OF THE TEST
       IF(INHFAD.EQ.0) THEN
          WRITE(6,50) LTB
       ELSE
          WRITE(6,150) LTB
       END IF
       IF(ML.NE.0) WRITE(6,*) ' MAXIMUM-LIKELIHOOD COMPUTATION'
       WRITE(6,62) SR,LBLK,MP,PATHTYP,SNRDB
       WRITE(6,991) (SDIR(I),I=1,NPR)
       WRITE(6,83)
       WRITE(6,94) SP
       WRITE(6,162) NP,FADBW
```

```
      WRITE(6,87) NCOR,L1R,L2R,L3R,NSTG
      IF(NPR.GE.1) THEN
         WRITE(6,64) FF,THRC,NPR,DELTA,AL0,DS
      ELSE
         WRITE(6,164) FF,THRC,NPR
         WRITE(6,991) (SDIR(I),I=1,NPR)
      END IF
      WRITE(6,158) APWRDB,APDB
      AVTSE=HTSQE/LTB
      ASNROUT=-10000000.
      IF(AVTSE.GT.0.) ASNROUT=-10*ALOG10(AVTSE)
      WRITE(6,188) SNRDB+APDB,AVKOUNT,AVTSE,ASNROUT
  188 FORMAT(' ACTUAL AVERAGE SNR',F6.2,' DB     AVE KOUNT',F6.2,' M
     +EAN-SQUARE ERROR',E10.4,'     EFFECTIVE SNR',F6.2,' DB')
      DO 170 IPR=0,NPR
      BER(IPR)=MERR(IPR)/FLOAT(LTB*MBIT)
      BERML(IPR)=LER(IPR)/FLOAT(LTB*MBIT)
  170 BERMML(IPR)=MLER(IPR)/FLOAT(LTB*MBIT)
      WRITE(6,*) '     PATH            RMS PATH-ERROR           BIT-ERROR RATE
     +S'
      WRITE(6,*) ' REFINEMENT  PRE-INFO  POST-INFO     SIMPLE LIKELY MAX
     +-LIK'
      DO 38 I=0,NPR
         RMSPR(I)=SQRT(CUMEPR(I)/LTB)
         RMSPO(I)=SQRT(CUMEPO(I)/LTB)
   38    WRITE(6,296) I,RMSPR(I),RMSPO(I),BER(I),BERML(I),BERMML(I)
  296 FORMAT(I7,2X,2F11.4,4X,3F8.5)
      IF(IPAUSE.NE.0) PAUSE

100 CONTINUE
      STOP
      END

SUBROUTINE NORMAL(Z,N,A,RR)
      COMPLEX Z(0:N-1)
      SS=0.
      DO 1 I=0,N-1
   01 SS=SS+Z(I)*CONJG(Z(I))
      RR=SQRT(A/SS)
      DO 2 I=0,N-1
   02 Z(I)=RR*Z(I)
      RETURN
      END

SUBROUTINE PATHREF(XRYM,XCYM,XFST,ADR,ADI,PDR,PDI,AST,BST,XBST,EX,
     +EST,IRM,LBM,LBLK,IXP,NNP,THRC,DELTA,ENSQN,AL0)
      COMPLEX XRYM(0:*),XCYM(0:*),XFST(0:*),ADR(0:*),ADI(0:*),AST(0:*),B
     +ST(0:*),XBST(0:*),EX(0:*),EST(0:*),CEJ
      REAL PDR(0:*),PDI(0:*)
      COMMON CEJ(0:127)
C COMPUTE THE GRADIENT OF THE METRIC WRT THE PATH STRUCTURE
C (IT MAY BE MORE EFFICIENT TO COMPUTE THE GRADIENT BY FORMULA)
      DO 22 K=0,IRM
         DO 23 I=0,LBM
            ADR(I)=XRYM(I)-XCYM(I)*(XFST(I)+DELTA*CEJ(MOD(K*I,LBLK)))
   23       ADI(I)=XRYM(I)-XCYM(I)*(XFST(I)+CMPLX(0.,DELTA)*CEJ(MOD(K*I,LB
     +      LK)))
         CALL NORM(ADR,ADRNS,ADRN,RMSADR,LBLK)
         CALL NORM(ADI,ADINS,ADIN,RMSADI,LBLK)
         PDR(K)=ADRNS-ENSQN
         PDI(K)=ADINS-ENSQN
   22 CONTINUE

C MOVE DOWN THE GRADIENT UNTIL MINIMUM METRIC IS FOUND APPROXIMATELY
      ALPHA=AL0
      ALGD=0.
```

```
      IUP=0
      IDN=0
      ISW=1
   20 DO 21 I=0,IRM
   21 AST(I)=EST(I)-ALPHA*CMPLX(PDR(I),PDI(I))
      CALL FFT(BST,XBST,LBLK,1)
      DO 24 I=0,LBM
   24 EX(I)=XRYM(I)-XCYM(I)*XBST(I)
      CALL NORM(EX,EXNS,EXN,RMSEX,LBLK)
      IF(EXNS.LT.ENSQN) THEN
         ENSQN=EXNS
         IUP=IUP+1
         ALGD=ALPHA
         ALPHA=2.**ISW*ALPHA
      ELSE
         IF((IUP.GT.0).AND.(IDN.GT.1)) GO TO 25
         IF(IDN.GE.10) RETURN
         IDN=IDN+1
         ISW=-1
         ALBD=ALPHA
         IF(IUP.EQ.0) ALPHA=.5*ALPHA
         IF(IUP.NE.0) ALPHA=.25*ALPHA
      END IF
      GO TO 20
   25 CONTINUE
C REFINE THE ESTIMATED PATH STRUCTURE BY THE CALCULATED DECREMENT
C ALONG THE GRADIENT
      DO 26 I=0,IRM
   26 EST(I)=EST(I)-ALGD*CMPLX(PDR(I),PDI(I))
      CALL THREST(EST,EST,THRC,IRM+1,IXP,NNP)
C REITERATE DATA DETECTION USING THE REFINED PATH ESTIMATE
      RETURN
      END

SUBROUTINE CORRCK(CSYM,XCYM,XRYM,XFST,ENSQN,LDIG,LX,NCOR,LBLK,LBM)
C CORRCK CHECKS THE METRIC FOR ALL COMBINATIONS OF THE NCOR BITS
C THAT THE INDICANT SHOWS MOST LIKELY TO BE IN ERROR
      COMPLEX CSYM(0:LBM),XCYM(0:LBM),XRYM(0:LBM),XFST(0:LBM),CEJ
      COMPLEX TCSYM(0:127),TXCYM(0:127),XNAT(0:127)
      INTEGER LDIG(2*LBLK),LX(0:LBM)
      COMMON CEJ(0:127)
      ICH=0
      DO 1 I=0,LBM
      TCSYM(I)=CSYM(I)
   01 TXCYM(I)=XCYM(I)
      DO 2 N=1,2**NCOR-1
         DO 3 M=0,NCOR-1
         MN=2**M
         MM=2*MN
         MP=2*MM
   03    IF(MOD(N+MN,MM).EQ.0) GO TO 4
   04    L=LX(M)
         K=L/2
         IF(MOD(N-MN,MP).LE.MM-1) THEN
            ISN=-1
         ELSE
            ISN=1
         END IF
         LE=MOD(L+1,2)
         LO=MOD(L,2)
         AK=ISN*(LE*REAL(TCSYM(K))+LO*IMAG(TCSYM(K)))
         DO 5 I=0,LBM
            TXCYM(I)=TXCYM(I)+2*AK*CMPLX(LE,LO)*CEJ(MOD(K*I,LBLK))
   05       XNAT(I)=XRYM(I)-TXCYM(I)*XFST(I)
         CALL NORM(XNAT,XNSQ,XNA,RMSXN,LBLK)
```

```
            IF(XNSQ.LT.ENSQN) THEN
              ICH=1
              NG=N
              ENSQN=XNSQ
            END IF
02       CONTINUE
          IF(ICH.EQ.1) THEN
            DO 6 M=0,NCOR-1
              MN=2**M
              MM=2*MN
              MP=2*MM
              MX=MOD(NG-MN,MP)
              IF((MX.GE.0).AND.(MX.LE.MM-1)) THEN
                LDIG(LX(M)+1)=-LDIG(LX(M)+1)
                L=LX(M)
                K=L/2
                LE=MOD(L+1,2)
                LO=MOD(L,2)
                AK=LE*REAL(TCSYM(K))+LO*IMAG(TCSYM(K))
                CSYM(K)=CMPLX(-LE*AK+LO*REAL(CSYM(K)),-LO*AK+LE*IMAG(CSYM(K)
     +))
              END IF
06          CONTINUE
            CALL FFT(CSYM,XCYM,LBLK,1)
          END IF
          RETURN
          END

SUBROUTINE SINGCK(CSYM,XCYM,XRYM,XFST,ENSQN,LDIG,LBLK,LBM,KOUNT,
     +NX,NCOR,L1R)
C  SINGCK CHECKS THE METRIC WHEN EACH OF THE L1R BITS THAT THE
C  INDICANT SHOWS MOST LIKELY TO BE IN ERROR IS ALTERED
          COMPLEX CSYM(0:LBM),XCYM(0:LBM),XRYM(0:LBM),XFST(0:LBM),CEJ
          COMPLEX XAYM(0:127),XNAT(0:127)
          INTEGER LDIG(2*LBLK),NX(0:*)
          COMMON CEJ(0:127)
          KOUNT=0
          IND=0
01       DO 46 J=NCOR,L1R-1
          KOUNT=KOUNT+1
          L=NX(J)
          K=L/2
          LE=MOD(L+1,2)
          LO=MOD(L,2)
          AK=LE*REAL(CSYM(K))+LO*IMAG(CSYM(K))
C  A BIT IS TAKEN TO BE CORRECT IF ITS GRADIENT IS LESS THAN THE
C  L1RTH LARGEST
          DO 65 I=0,LBM
            XAYM(I)=XCYM(I)-2*AK*CMPLX(LE,LO)*CEJ(MOD(K*I,LBLK))
65          XNAT(I)=XRYM(I)-XAYM(I)*XFST(I)
          CALL NORM(XNAT,XNSQ,XNA,RMSXN,LBLK)
          IF(XNSQ.LT.ENSQN) THEN
            IND=1
            PRENS=ENSQN
            ENSQN=XNSQ
            CSYM(K)=CMPLX(-LE*AK+LO*REAL(CSYM(K)),-LO*AK+LE*IMAG(CSYM(K)))
            LDIG(L+1)=-LDIG(L+1)
            DO 66 I=0,LBM
66            XCYM(I)=XAYM(I)
          ELSE
            IND=IND+1
          END IF
          IF(IND.GE.L1R) RETURN
46       CONTINUE
          GO TO 1
```

```
C   ITERATE UNTIL NO SMALLER DISTANCE CAN BE FOUND BY THIS PROCESS
C   REMOVING "GO TO 1" AND "IND-RELATED" STATEMENTS WILL CAUSE A
C   ONE-TIME SINGLE CHECK OF THE L1R LEAST-CONFIDENT BITS
      RETURN
      END

SUBROUTINE DOUBCK(CSYM,XCYM,XRYM,XFST,ENSQN,LDIG,LBLK,LBM,NCOR,
     +L2R,NX)
C   DOUBCK CHECKS THE METRIC WHEN EACH PAIR OF THE L2R BITS THAT THE
C   INDICANT SHOWS MOST LIKELY TO BE IN ERROR IS ALTERED
      COMPLEX CSYM(0:LBM),XCYM(0:LBM),XRYM(0:LBM),XFST(0:LBM),CEJ
      COMPLEX XAYM(0:127),XBYM(0:127),XNAT(0:127),XMAT(0:127)
      INTEGER LDIG(2*LBLK),NX(0:*)
      COMMON CEJ(0:127)
      DO 40 II=NCOR,L2R-1
        L=NX(II)
        K=L/2
        LE=MOD(L+1,2)
        LO=MOD(L,2)
 46     AL=LE*REAL(CSYM(K))+LO*IMAG(CSYM(K))
        DO 55 I=0,LBM
 55       XAYM(I)=XCYM(I)-2*AL*CMPLX(LE,LO)*CEJ(MOD(K*I,LBLK))
        DO 40 JJ=0,II-1
          M=NX(JJ)
        J=M/2
        ME=MOD(M+1,2)
        MO=MOD(M,2)
        AM=ME*REAL(CSYM(J))+MO*IMAG(CSYM(J))
        DO 43 I=0,LBM
        XBYM(I)=XAYM(I)-2*AM*CMPLX(ME,MO)*CEJ(MOD(J*I,LBLK))
 43     XMAT(I)=XRYM(I)-XBYM(I)*XFST(I)
        CALL NORM(XMAT,XMSQ,XMA,RMSXM,LBLK)
        PRENS=ENSQN
        IF(XMSQ.LT.ENSQN) THEN
          ENSQN=XMSQ
          CSYM(K)=CMPLX(-LE*AL+LO*REAL(CSYM(K)),-LO*AL+LE*IMAG(CSYM(K)))
          CSYM(J)=CMPLX(-ME*AM+MO*REAL(CSYM(J)),-MO*AM+ME*IMAG(CSYM(J)))
          LDIG(L+1)=-LDIG(L+1)
          LDIG(M+1)=-LDIG(M+1)
          DO 56 I=0,LBM
 56         XCYM(I)=XBYM(I)
        END IF
 40   CONTINUE
      RETURN
      END

SUBROUTINE TRIPCK(CSYM,XCYM,XRYM,XFST,ENSQN,LDIG,LBLK,LBM,NCOR,
     +L3R,NX)
C   TRIPCK CHECKS THE METRIC WHEN EACH TRIPLET OF THE L3R BITS THAT
C   THE INDICANT SHOWS MOST LIKELY TO BE IN ERROR IS ALTERED
      COMPLEX CSYM(0:LBM),XCYM(0:LBM),XRYM(0:LBM),XFST(0:LBM),CEJ
      COMPLEX XAYM(0:127),XBYM(0:127),XTYM(0:127),XNAT(0:127),XMAT(0:127
     +)
      INTEGER LDIG(2*LBLK),NX(0:*)
      COMMON CEJ(0:127)
      DO 40 III=L3R-1,NCOR,-1
        N=NX(III)
        K3=N/2
        NE=MOD(N+1,2)
        NO=MOD(N,2)
        AN=NE*REAL(CSYM(K3))+NO*IMAG(CSYM(K3))
        NA=AN
        DO 45 I=0,LBM
 45       XTYM(I)=XCYM(I)-2*AN*CMPLX(NE,NO)*CEJ(MOD(K3*I,LBLK))
        DO 40 II=III-1,1,-1
```

```
              L=NX(II)
              K=L/2
              LE=MOD(L+1,2)
              LO=MOD(L,2)
              AL=LE*REAL(CSYM(K))+LO*IMAG(CSYM(K))
              LA=AL
              DO 55 I=0,LBM
  55             XAYM(I)=XTYM(I)-2*AL*CMPLX(LE,LO)*CEJ(MOD(K*I,LBLK))
              DO 40 JJ=II-1,0,-1
                 M=NX(JJ)
                 ICH=0
                 J=M/2
                 ME=MOD(M+1,2)
                 MO=MOD(M,2)
                 AM=ME*REAL(CSYM(J))+MO*IMAG(CSYM(J))
                 MA=AM
                 DO 43 I=0,LBM
                    XBYM(I)=XAYM(I)-2*AM*CMPLX(ME,MO)*CEJ(MOD(J*I,LBLK))
  43                XMAT(I)=XRYM(I)-XBYM(I)*XFST(I)
                 CALL NORM(XMAT,XMSQ,XMA,RMSXM,LBLK)
                 PRENS=ENSQN
                 IF(XMSQ.LT.ENSQN) THEN
                    ENSQN=XMSQ
                    CSYM(K)=CMPLX(-LE*AL+LO*REAL(CSYM(K)),-LO*AL+LE*IMAG(CSYM(
     +K)))
                    CSYM(J)=CMPLX(-ME*AM+MO*REAL(CSYM(J)),-MO*AM+ME*IMAG(CSYM(
     +J)))
                    CSYM(K3)=CMPLX(-NE*AN+NO*REAL(CSYM(K3)),-NO*AN+NE*IMAG(CSY
     +M(K3)))
                    ICH=1
                    LDIG(N+1)=-LDIG(N+1)
                    LDIG(L+1)=-LDIG(L+1)
                    LDIG(M+1)=-LDIG(M+1)
                    DO 56 I=0,LBM
  56                   XCYM(I)=XBYM(I)
                 END IF
  40          CONTINUE
              RETURN
              END

SUBROUTINE STRGCK(BSYM,CSYM,XCYM,XRYM,XFST,ENSQN,LDIG,LX,NCOR,LBLK
     +,LBM,MPAT,MBIT)
C     STRGCK CHECKS THE METRIC FOR ALL COMBINATIONS OF THE 5 BITS IN THE
C     REAL OR IMAGINARY STRINGS CENTERED ON EACH OF THE NSTG BITS THAT
C     THE INDICANT SHOWS MOST LIKELY TO BE IN ERROR
              COMPLEX CSYM(0:LBM),XCYM(0:LBM),XRYM(0:LBM),XFST(0:LBM),CEJ
              COMPLEX TCSYM(0:63),TXCYM(0:127),XNAT(0:127)
              INTEGER LDIG(2*LBLK),LX(0:LBM),M1X(0:13),M2X(0:13),NX(-2:2)
              REAL BSYM(0:2*LBLK-1),TBSYM(0:127)
              COMMON CEJ(0:127)
              EQUIVALENCE (TCSYM,TBSYM)
              DATA M1X/-2,-1,0,-2,1,-2,2,-2,2,-1,2,0,1,2/
C     M1X INDICATES POSITION RELATIVE TO THE KEY LOCATION THAT IS CHANGED
              DATA M2X/+2,+2,+2,-2,+2,+2,+2,-2,-2,-2,+2,-2,-2,-2/
C     M2X INDICATES WHETHER THE CHANGE IS AN ADDITION OR A SUTRACTION
              DO 2 N=0,NCOR-1
                 DO 1 I=0,LBM
                    TCSYM(I)=CSYM(I)
  01                TXCYM(I)=XCYM(I)
                 DO 3 IX=-2,2
  03                NX(IX)=LX(N)+2*IX
C     NX INDEXES THE LOCATIONS OF THE MEMBERS OF THE STRING
                 L=NX(0)
                 LE=MOD(L+1,2)
                 LO=MOD(L,2)
```

```
      DO 4 J=0,11
         L=NX(M1X(J))
C L INDICATES WHICH DIGIT HAS BEEN CHANGED
         K=L/2
         AK=LE*REAL(CSYM(K))+LO*IMAG(CSYM(K))
         TBSYM(L)=-TBSYM(L)
         DO 5 I=0,LBM
            TXCYM(I)=TXCYM(I)-AK*M2X(J)*CMPLX(LE,LO)*CEJ(MOD(K*I,LBLK))
05          XNAT(I)=XRYM(I)-TXCYM(I)*XFST(I)
         IF((J.EQ.0).OR.(J.EQ.4)) GO TO 4
         CALL NORM(XNAT,XNSQ,XNA,RMSXN,LBLK)
         IF(XNSQ.LT.ENSQN) THEN
            DO 56 I=1,MPAT
               IF(TBSYM(I-1)*LDIG(I).LE.0.) GO TO 4
56             IF(TBSYM(MBIT+MPAT+I-1)*LDIG(MBIT+MPAT+I).LE.0.) GO TO 4
            ENSQN=XNSQ
            DO 6 I=0,LBM
               CSYM(I)=TCSYM(I)
06             XCYM(I)=TXCYM(I)
            DO 57 I=MPAT+1,2*LBLK-MPAT
               LDIG(I)=1
57             IF(BSYM(I-1).LT.0.) LDIG(I)=-LDIG(I)
         END IF
04    CONTINUE
02    CONTINUE
      RETURN
      END

FUNCTION RANFD()
      DATA LF,A,B,T,S/0,225.,1.,2.435974E+10,4.105134E-11/
      IF(LF.NE.0) GO TO 2
      LF=1
      X=321470281.
02    X=MOD(A*X+B,T)
03    RANFD=S*X
      RETURN
      END

FUNCTION RANFN()
      DATA LF,A,B,T,S/0,129.,3.,3.435974E+10,2.910383E-11/
      IF(LF.NE.0) GO TO 2
      LF=1
      X=182074123.
02    X=MOD(A*X+B,T)
03    RANFN=S*X
      RETURN
      END

FUNCTION RNDNRM(RANTYPE)
C RNDNRM GENERATES 0-MEAN,1-VARIANCE NORMALLY DISTRIBUTED PSEUDO-
C RANDOM NUMBERS
      CHARACTER*8 RANTYPE
02    IF (RANTYPE.EQ.'NOISE   ') THEN
         R1=RANFN()
         R2=RANFN()
      ELSE IF (RANTYPE.EQ.'RAYLEIGH') THEN
         R1=RANFF()
         R2=RANFF()
      END IF
      W=R2-.5
      X=ABS(W)-.2
04    IF(X)6,6,8
06    IF(R1-.9955698)32,32,30
08    IF(X-.17)9,9,14
09    IF(R1-.59035036)32,32,10
```

```
10  R1MTL=81.3*X*X*X-.9895+R1
    IF(R1MTL)32,32,12
12  IF(R1MTL-.0235)30,30,2
14  IF(X-.24)16,16,20
16  IF(R1-2.024+8.4*X)18,18,2
18  IF(10.13*X-2.31245+R1)32,32,30
20  IF(R1-.008)30,30,2
30  Z=R2*(.5-W)
    RNDNRM=W*(1.77079939+.402454407/Z)
    IF(ABS(RNDNRM).GE.10) GO TO 2
    T=.119047619*(.5-Z)/(Z*Z)+.523809524
    T=T*EXP(-.5*RNDNRM*RNDNRM)
    IF(R1-T)40,40,2
32  Z=R2*(.5-W)
    RNDNRM=W*(1.77079939+.402454407/Z)
40  RETURN
    END

SUBROUTINE NORM(A,C,D,R,N)
    COMPLEX A(0:N-1)
    C=0.
    DO 1 I=0,N-1
01  C=C+A(I)*CONJG(A(I))
    D=C/N
    R=SQRT(D)
    RETURN
    END

SUBROUTINE THREST(A,Z,THRC,N,IXP,NNP)
    COMPLEX A(0:N-1),Z(0:N-1)
    REAL B(0:127)
    NNP=0
    BM=-1.
    DO 1 I=0,N-1
      B(I)=A(I)*CONJG(A(I))
01    IF(B(I).GT.BM) BM=B(I)
    DO 02 I=0,N-1
      THRES=THRC*BM
      IF(B(I).LT.THRES) THEN
        Z(I)=(0.,0.)
      ELSE
        IXP=I
        NNP=NNP+1
02    END IF
    RETURN
    END

SUBROUTINE FFT(A,B,N,ISIGN)
    COMPLEX A(N),B(N),W,WP,TEMP
    DO 7 I=1,N
07  B(I)=A(I)
    J=1
    DO 11 I=1,N
      IF(J.GT.I) THEN
        TEMP=B(J)
        B(J)=B(I)
        B(I)=TEMP
      END IF
      M=N/2
01    IF((M.GE.2).AND.(J.GT.M)) THEN
        J=J-M
        M=M/2
        GO TO 1
      END IF
      J=J+M
11  CONTINUE
```

```
      MMAX=1
02    IF(N.GT.MMAX) THEN
         ISTEP=2*MMAX
         THETA=3.141593/(ISIGN*MMAX)
         WP=CMPLX(-2.*SIN(.5*THETA)**2,-SIN(THETA))
         W=(1.,0.)
         DO 13 M=1,MMAX
            DO 12 I=M,N,ISTEP
              J=I+MMAX
              TEMP=W*B(J)
              B(J)=B(I)-TEMP
              B(I)=B(I)+TEMP
12          CONTINUE
            W=W*(1.+WP)
13       CONTINUE
         MMAX=ISTEP
         GO TO 2
      END IF
      IF(ISIGN.EQ.-1) THEN
         DO 14 I=1,N
14          B(I)=B(I)/N
      END IF
      RETURN
      END

SUBROUTINE SANK(X,Y,L,M,LX)
C  SANK ORDERS M REAL NUMBERS FROM A LIST OF L ACCORDING TO INCREASING
C  VALUE.  LX(.) INDEXES LOCATIONS OF THE NUMBERS ON THE ORIGINAL LIST.
      INTEGER LX(0:M-1)
      REAL X(0:L-1),Y(0:M-1)
C  INITIALIZE
      DO 1 J=0,M-1
01       Y(J)=1.E+30
C  ORDER AND STORE THE FIRST M VALUES
      DO 2 K=0,M-1
         CAND=X(K)
         DO 3 I=0,K
            IF(CAND.GE.Y(I)) GO TO 3
               DO 4 J=K,I+1,-1
                  LX(J)=LX(J-1)
04                Y(J)=Y(J-1)
               LX(I)=K
               Y(I)=CAND
               GO TO 2
03       CONTINUE
02    CONTINUE
C  TEST, ORDER, AND STORE REMAINING VALUES APPROPRIATELY
      DO 5 K=M,L-1
         CAND=X(K)
         IF(CAND.GE.Y(M-1)) GO TO 5
            DO 6 I=M-2,0,-1
               IF(CAND.LT.Y(I)) GO TO 6
                  DO 7 J=M-1,I+2,-1
                     LX(J)=LX(J-1)
07                   Y(J)=Y(J-1)
                  LX(I+1)=K
                  Y(I+1)=CAND
                  GO TO 5
06          CONTINUE
            DO 18 J=M-1,1,-1
               LX(J)=LX(J-1)
18             Y(J)=Y(J-1)
            LX(0)=K
            Y(0)=CAND
05    CONTINUE
      RETURN
      END
```

```
      SUBROUTINE ERRIND(ET,ENSQN,LDIG,KDIG,IERR,NERR,EBIT,XIND,INX,N,
     +NEI,NEIX)
      INTEGER LDIG(N),KDIG(N),IERR(N),INX(0:N-1),NEI(0:15)
      REAL EBIT(0:N-1),XIND(0:N-1)
      CHARACTER*8 ET
      IE=0
      NERR=0
      NEIX=NEIX+1
      DO 29 I=1,N
        IF(KDIG(I).NE.LDIG(I)) NERR=NERR+1
 29   CONTINUE
      DO 01 I=1,N
        IERR(I)=(1-LDIG(I)*KDIG(I))/2
C  LDIG IS THE DEMODULATED SIGNAL; IERR IS THE ERROR INDICATOR
 01     IF(IERR(I).NE.0) IE=1
      IF(IE.EQ.1) THEN
        WRITE(6,*) 'ERRORS  BIT NO.   VALUE      INDICANT   RANK'
        DO 2 I=1,N
          IF(IERR(I).NE.0) WRITE(6,9) I-1,EBIT(I-1),XIND(I-1),INX(I-1)
 09       FORMAT(8X,I5,F10.4,F11.2,I6)
 02     CONTINUE
      END IF
      NEI(NEIX)=NERR
      WRITE(6,8) ET,NERR,ENSQN
 08   FORMAT(1X,A7,I3,' ERRORS       METRIC =',F12.2)
      RETURN
      END

SUBROUTINE FADING(SP,IRM,JPX,Y1,YMS,MP,NB,FADBW,NP,SR,IFX)
C  FADING IS MODELLED BY MULTIPLE SIGNAL COMPONENTS EACH DELAYED
C  IN TIME AND INDEPENDENTLY RAYLEIGH FADING
C  SP IS THE LONG-TERM AVERAGE MULTIPATH STRUCTURE
C  MP IS THE NUMBER OF COMPONENTS OF THE SIGNAL
C  NB IS THE NUMBER OF INDEPENDENT SAMPLES PER BLOCK
C  FADBW IS (COMMON) 3-DB BANDWIDTH OF THE RAYLEIGH FADING PROCESSES
C  NP IS THE NUMBER OF POLES IN THE BUTTERWORTH FILTER
C  SR IS THE SAMPLE RATE
      COMPLEX SP(0:IRM),W,X(5),XP(5),Y(5),YP(5,3),YPP(5,3),YJM(5,3),Y
     +1(MP,NB)
      REAL YM(144,5),YA(144,5),YMS(5),CF(20)
C  CF IS THE CALIBRATION FACTOR FOR THE RAYLEIGH GENERATOR
      REAL*8 G(0:7,2),H(0:7,2)
C  G AND H ARE BUTTERWORTH FILTER COEFFICIENTS
      INTEGER S,JPX(MP)
      DATA PI,CON,MFLUSH/3.14159265,57.29578,10/
      DATA CF/.90,19*.96/
      DATA X/5*(0.,0.)/,YJM/15*(1.,0.)/,YP/15*(1.,0.)/
C  IFX INDEXES THE NUMBER OF (NON-CONSTANT-LENGTH) BLOCKS FOR WHICH
C  FADING HAS BEEN GENERATED
      IF(IFX.NE.0) GO TO 18
      LFLUSH=5*64*MFLUSH/FADBW/NB
      FC=.5*FADBW
      NT=2*NP
      CALL BBUTFIL(FC,SR,NP,NT,G,H,BWN)
      CN=CF(FADBW)*SQRT(SR/(2*FC*BWN))
 18   DO 12 J=1,MP
 12     YMS(J)=0.
      DO 11 S=1,NB
        DO 1 J=1,MP
          DO 19 M=(NP+1)/2,(NP+1)/2+(NP-1)/2
            YPP(J,M)=YP(J,M)
 19         YP(J,M)=YJM(J,M)
          XP(J)=X(J)
          X(J)=CMPLX(RNDNRM('RAYLEIGH'),RNDNRM('RAYLEIGH'))
          Y(J)=0.
```

```
          DO 20 M=(NP+1)/2,(NP+1)/2+(NP-1)/2
YJM(J,M)=CN*(G(M,1)*X(J)+G(M,2)*XP(J))+H(M,1)*YP(J,M)+H(M,2)
     +*YPP(J,M)
  20       Y(J)=Y(J)+YJM(J,M)
           Y1(J,S)=SP(JPX(J))*Y(J)
  01       YMS(J)=YMS(J)+Y1(J,S)*CONJG(Y1(J,S))
  11     CONTINUE
       IFX=IFX+1
       IF(IFX.LE.LFLUSH) GO TO 18
       RETURN
       END

FUNCTION RANFF()
       DATA LF,A,B,T,S/0,171.,0.,1.099512E+12,9.094947E-13/
       IF(LF.NE.0) GO TO 2
       LF=1
       X=2838878621.
  02   X=MOD(A*X+B,T)
       RANFF=S*X
       RETURN
       END

SUBROUTINE BBUTFIL(FC,FS,N,NT,G,H,POUT)
C  BBUTFIL DETERMINES FILTER COEFFICIENTS OF THE PARALLEL REALIZATION
C  OF AN N-POLE BUTTERWORTH DIGITAL FILTER AT BASEBAND FOR N = 2,3,4.
C  IT ALSO CALCULATES THE NOISE BANDWIDTH
C  N IS THE ORDER OF THE FILTER
C  FC IS THE CUTOFF (3-DB) FREQUENCY OF THE FILTER
C  FS IS THE SAMPLING RATE
       IMPLICIT DOUBLE PRECISION (A-E,G-H,R-Z)
       REAL*8 U(0:8),V(0:8),B(0:8),C(0:8),G(0:7,2),H(0:7,2)
       COMPLEX*16 Z(0:8),A(0:8),P,CGAIN,RES(0:7),RET(0:7),SRES,SRET,PDP,P
     +OL(0:7)
       DATA PI/3.141592654/
       TPI=2*PI
       AT=TAN(PI*FC/FS)
       DO 10 M=0,NT-1
         IF(MOD(N,2).EQ.0) THEN
           D=1-2*AT*COS((2*M+1)*PI/(2*N))+AT*AT
           U(M)=(1.-AT*AT)/D
           V(M)=2*AT*SIN((2*M+1)*PI/(2*N))/D
         ELSE
           D=1-2*AT*COS(M*PI/N)+AT*AT
           U(M)=(1.-AT*AT)/D
           V(M)=2*AT*SIN(M*PI/N)/D
         END IF
         Z(M)=CMPLX(U(M),V(M))
C  Z( ) ARE THE POLE LOCATIONS OF THE NTH ORDER BUTTERWORTH FILTER
  10   CONTINUE
       CGAIN=2.**(-N)
       DO 1 M=(N+1)/2,(3*N-1)/2
         P=1.
         DO 2 J=(N+1)/2,(3*N-1)/2
           IF(J.EQ.M) GO TO 2
           P=P*(Z(M)-Z(J))
  02     CONTINUE
         A(M)=(Z(M)+1.)**N/P
         B(M)=REAL(A(M))
         C(M)=AIMAG(A(M))
  01     CGAIN=CGAIN*(1.-Z(M))
       GAIN=CGAIN
       DO 3 M=(N+1)/2,(N+1)/2+(N-1)/2
         IF((MOD(N,2).EQ.0).OR.(M.LT.N)) THEN
           G(M,1)=GAIN*2*B(M)
           G(M,2)=-GAIN*2*(B(M)*U(M)+C(M)*V(M))
```

```
C  G(M,L) IS THE GAIN-COEFFICIENT OF THE DIRECT LEG WITH DELAY L
      H(M,1)=2*U(M)
      H(M,2)=-(U(M)**2+V(M)**2)
C  H(M,L) IS THE GAIN-COEFFICIENT OF THE FEEDBACK LEG WITH DELAY L
      ELSE
      G(N,1)=GAIN*B(N)
      G(N,2)=0.
      H(N,1)=U(N)
      H(N,2)=0.
      END IF
03    CONTINUE
      DO 39 I=0,NT-1
39    POL(I)=CEXP(CMPLX(0.,(I+.5)*PI/N))
      SRES=0.
      SRET=0.
      DO 40 I=0,N-1
      PDP=1.
      DO 41 J=0,NT-1
      IF(J.EQ.I) GO TO 41
      PDP=PDP*(POL(I)-POL(J))
41    CONTINUE
      RES(I)=1./PDP
      RET(I)=POL(I)**2/PDP
      SRES=SRES+RES(I)
40    SRET=SRET+RET(I)
      POUT=CMPLX(0.,TPI)*SRES
      QOUT=CMPLX(0.,TPI)*SRET
      RETURN
      END

SUBROUTINE RAYLEIGH(SP,IRM,JPX,ENV,MP,INH)
      COMPLEX SP(0:IRM),ENV(MP)
      INTEGER JPX(MP)
      IF(INH.NE.0) THEN
      DO 2 J=1,MP
02    ENV(J)=SP(JPX(J))
      ELSE
      DO 1 J=1,MP
01 ENV(J)=SP(JPX(J))*SQRT(.5)*CMPLX(RNDNRM('RAYLEIGH'),RNDNRM('RA
   +YLEIGH'))
      END IF
      RETURN
      END

SUBROUTINE SYMGRAD(CSYM,XCYM,XRYM,XFST,ENSQN,LBLK,LBM,MBIT,DS,PD,
   +MPAT,EBIT)
C  SYMGRAD COMPUTES THE GRADIENT OF THE METRIC WRT THE DATA SYMBOLS
      COMPLEX CSYM(0:LBM),XCYM(0:LBM),XRYM(0:LBM),XFST(0:LBM),CEJ,
   +XAYM(0:127),XNAT(0:127)
      REAL PD(0:2*LBLK-1),EBIT(0:*)
      COMMON CEJ(0:127)
      DO 10 L=MPAT,MPAT+MBIT-1
      K=L/2
      LE=MOD(L+1,2)
      LO=MOD(L,2)
      AK=LE*REAL(CSYM(K))+LO*IMAG(CSYM(K))
      DO 65 I=0,LBM
      XAYM(I)=XCYM(I)+DS*CMPLX(LE,LO)*CEJ(MOD(K*I,LBLK))
65    XNAT(I)=XRYM(I)-XAYM(I)*XFST(I)
      CALL NORM(XNAT,XNSQ,XNA,RMSXN,LBLK)
      SI=SIGN(1.,EBIT(L))
10    PD(L)=SI*(XNSQ-ENSQN)/DS
      RETURN
      END
```

I claim:

1. For any positive integers N, M, and K with N=K+2M, a method for detection or demodulation of a phase-and-amplitude-shift-keyed signal having a block format wherein each block has N symbols and is comprised of a known fixed pattern of M symbols preceding and following K symbols of data, where said signal is transmitted through a channel that may have multiple propagation paths and may add interfering noise, said method comprising the steps of:

a. obtaining from a received waveform complex samples of its complex-envelope at a rate which is an integer multiple of its symbol rate;
   b. establishing block synchronization and symbol synchronization for said complex samples;
   c. down-sampling to the symbol rate, and buffer-storing the N complex samples of the block to be detected and the first M complex samples of the next subsequent block;
   d. computing the M-point fast Fourier transform (FFT) of the first M complex samples of said block to be detected, and computing the M-point FFT of the first M complex samples of said next subsequent block, where an M-point FFT is an efficient algorithm for evaluating an M-point discrete Fourier transform;
   e. computing a weighted average of the two FFT's computed in step d;
   f. computing the quotient of said average formed in step e divided component-by-component by the precomputed M-point FFT of said known fixed pattern;
   g. obtaining a complex vector that is an estimate of the multipath-structure of the channel by computing the M-point inverse fast Fourier transform (IFFT) of said quotient formed in step f, and subjecting the components of said IFFT to a threshold;
   h. computing the N-point FFT of said estimate of the multipath-structure of the channel obtained in step g padded with K+M zeros;
   i. scaling up the small components of said N-point FFT computed in step h and replacing any zero by a non-zero number;
   j. computing the N-point FFT of said block to be detected;
   k. dividing component-by-component said N-point FFT formed in step j by the result of step i;
   l. forming analog estimates of said data symbols and pattern symbols by computing the IFFT of the result of step k;
   m. detection of said analog estimates of said data symbols formed in step 1 by an operation appropriate for detection of a signal of the same modulation transmitted over a noisy channel having but a single propagation path.

2. For any positive integers N, M, and K with N=K+2M, a method for detection or demodulation of a phase-and-amplitude-shift-keyed signal having a block format wherein each block has N symbols and is comprised of a known fixed pattern of M symbols preceding and following K symbols of data, where said signal is transmitted through a channel that may have multiple propagation paths and may add-interfering noise, said method comprising the steps of:

a. obtaining from a received waveform complex samples of its complex-envelope at a rate which is an integer multiple of its symbol rate;
   b. establishing block synchronization and symbol synchronization for said complex samples;
   c. down-sampling to the symbol rate, and buffer-storing the N complex samples of the block to be detected;
   d. computing the N-point Fast Fourier Transform (FFT) of said block to be detected;
   e. obtaining a preliminary analog estimate of the K data symbols in said block;
   f. obtaining an estimate of the multipath-structure of the channel;
   g. obtaining a preliminary detection of said K data symbols;
   h. performing analog adjustment of said estimated multipath-structure, this adjustment to be omitted on the second pass and subsequent even passes;
   i. performing digital adjustment of the preliminary detected data symbols, this adjustment to be omitted on the first pass and subsequent odd passes;
   j. forming the component-by-component product of the N-point FFT of the block comprising said current estimates of the K data symbols preceded and followed by said known fixed pattern of M symbols multiplied by the N-point FFT of the current estimate of the multipath structure padded with K+M zeros;
   k. generating an error vector equal to the difference of said N-point FFT of said received block computed in step d and the result of step j;
   l. using said error vector to compute a metric that provides a measure of the difference between said N-point FFT of said received block and the result of step j;
   m. using said metric to determine whether said adjustment is an improvement and to control subsequent adjustments of said preliminary detected data symbols and of said estimate of the multipath structure;
   n. retaining those M symbols that are regarded as the best current estimate of the multipath structure and those K symbols that are regarded best as the current estimate of the data;
   o. iterating steps h through n as desired to obtain a refined estimate of the data.

3. For any positive integers N, M, and K, a method for detection or demodulation of a phase-and-amplitude-shift-keyed signal having a block format wherein each block has N symbols and is comprised of a known fixed pattern of M symbols preceding and following K symbols of data, where said signal is transmitted through a channel that may have multiple propagation paths and may add interfering noise, said method comprising the steps of:

a. obtaining from a received waveform complex samples of its complex-envelope at a rate which is an integer multiple of its symbol rate;
   b. establishing block synchronization and symbol synchronization for said complex samples;
   c. down-sampling to the symbol rate, and buffer-storing the N complex samples of the block to be detected;
   d. computing the N-point fact Fourier transform (FFT) of said block to be detected;
   e. obtaining a preliminary analog estimate of the K data symbols in said block;
   f. obtaining an estimate of the multipath-structure of the channel;
   g. obtaining a preliminary detection of said K data symbols;

h. performing digital adjustment of the preliminary detected data symbols, this adjustment to be omitted on the second pass and subsequent even passes;

i. performing analog adjustment of said estimate multipath-structure, this adjustment to be omitted on the first pass and subsequent odd passes;

j. forming the component-by-component product of the N-point FFT of the block comprising said current estimates of the K data symbols preceded and followed by said known fixed pattern of M symbols multiplied by the N-point FFT of the current estimate of the multipath structure padded with K+M zeros;

k. generating an error vector equal to the difference of said N-point FFT of said received block computed in step d and the result of step j;

l. using said error vector to compute a metric that provides a measure of the difference between said N-point FFT of said received block and the result of step j;

m. using said metric to determine whether said adjustment is an improvement and to control subsequent adjustments of said preliminary detected data symbols and of said estimate of the multipath structure;

n. retaining those M symbols that are regarded as the best current estimate of the multipath structure and those K symbols that are regarded best as the current estimate of the data;

o. iterating steps h through n as desired to obtain a refined estimate of the data.

4. The invention of claim 2 or claim 3 wherein said estimate of the multipath-structure is adjusted depending upon the gradient of said metric with respect to the multipath-structure.

5. The invention of claim 2 or claim 3 wherein said adjustment of said detected symbols is controlled by an indicant vector, said indicant vector being a vector whose components give some indication of the likelihood of error in corresponding data symbols.

6. The invention of claim 5 wherein said indicant vector is obtained from the absolute values of the analog estimates of the data components.

7. The invention of claim 5 wherein said indicant vector is obtained from the gradient of said metric with respect to said current detected data.

8. The invention of claim 5 wherein said indicant vector is computed by component-by-component division of said error vector by the N-point FFT of said estimate of the multipath-structure with small components of said FFT amplified and zero replaced by a non-zero number, forming the inverse fast Fourier transform (IFFT) of the quotient, and controlling the sign of each component by the sign of the corresponding component of said current detected data.

9. The invention of claim 1 or claim 2 wherein bit synchronization and block synchronization are obtained by trial using the method of claim 1 but omitting step 21b to obtain an analog estimate of said fixed pattern, then computng a measure of the difference between said estimate and said known fixed pattern, and declaring synchronization when said measure is satisfactorily small.

* * * * *